US011785097B2

(12) United States Patent
Kweon et al.

(10) Patent No.: US 11,785,097 B2
(45) Date of Patent: Oct. 10, 2023

(54) METHOD AND APPARATUS FOR TRANSMITTING NOTIFICATION TO TARGET AF IN WIRELESS COMMUNICATION SYSTEM

(71) Applicant: Samsung Electronics Co., Ltd., Suwon-si (KR)

(72) Inventors: Kisuk Kweon, Suwon-si (KR); Hyesung Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 17/225,510

(22) Filed: Apr. 8, 2021

(65) Prior Publication Data

US 2021/0320979 A1    Oct. 14, 2021

(30) Foreign Application Priority Data

Apr. 8, 2020    (KR) .................. 10-2020-0043041

(51) Int. Cl.
  *H04L 29/08*    (2006.01)
  *H04W 36/00*    (2009.01)
  *H04L 67/148*   (2022.01)

(52) U.S. Cl.
  CPC ....... *H04L 67/148* (2013.01); *H04W 36/0011* (2013.01); *H04W 36/0077* (2013.01)

(58) Field of Classification Search
  CPC ............. H04L 67/148; H04L 41/0816; H04W 36/0011; H04W 36/0077; H04W 36/12; H04W 60/04; H04W 80/10
  See application file for complete search history.

(56) References Cited

U.S. PATENT DOCUMENTS

| 11,553,454 | B2 * | 1/2023 | Singh ...................... H04W 4/60 |
| 2018/0192471 | A1 | 7/2018 | Li et al. |
| 2019/0357301 | A1 * | 11/2019 | Li ......................... H04W 80/10 |
| 2020/0068653 | A1 | 2/2020 | Li et al. |
| 2021/0195554 | A1 * | 6/2021 | Singh ...................... H04W 4/60 |
| 2021/0243826 | A1 * | 8/2021 | Hoffmann ........... H04W 68/005 |
| 2021/0314266 | A1 * | 10/2021 | Li .......................... H04L 47/20 |

(Continued)

FOREIGN PATENT DOCUMENTS

| WO | 2019/101292 A1 | 5/2019 |
| WO | 2020/035357 A1 | 2/2020 |

OTHER PUBLICATIONS

3GPP; TSG SA; Procedures for the 5GS; Stage 2 (Release 16)', 3GPP TS 23.502 V16.4.0, Mar. 27, 2020 sections 4.3.5.7,4.3.6.3; and figure 4.3.6.3-1 1-15.

(Continued)

*Primary Examiner* — Luat Phung
(74) *Attorney, Agent, or Firm* — Jefferson IP Law, LLP

(57) ABSTRACT

A method performed by an application function (AF) in a wireless communication system is provided. The method includes receiving, from a session management function (SMIF), a late notification message indicating a change of a data network access identifier (DNAI), identifying whether an AF change is needed based on the late notification message, and transmitting, to the SMIF, a response message including information for change to a target AF for a target DNAI based on a result of identifying that the AF change is needed.

20 Claims, 9 Drawing Sheets

(56) References Cited

U.S. PATENT DOCUMENTS

| | | | |
|---|---|---|---|
| 2022/0007180 A1* | 1/2022 | Liao | H04W 12/06 |
| 2022/0109633 A1* | 4/2022 | Li | H04L 67/51 |
| 2022/0182890 A1* | 6/2022 | Shan | H04W 36/0016 |
| 2022/0224646 A1* | 7/2022 | Xiong | H04L 45/02 |
| 2022/0360977 A1* | 11/2022 | Kim | H04W 36/12 |

OTHER PUBLICATIONS

3GPP; TSG SA; System architecture for the 5GS (Release 16)', 3GPP TS 23.501 V16.4.0, Mar. 27, 2020 A section 5.6.7 1-15.
International Search Report dated Jul. 16, 2021, issued in International Patent Application No. PCT/KR2021/004400.
European Search Report dated Jan. 4, 2023, issued in European Application No. 21785188.0.

\* cited by examiner

METHOD AND APPARATUS FOR TRANSMITTING NOTIFICATION TO TARGET AF IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0043041, filed on Apr. 8, 2020, in the Korean Intellectual Property Office, the disclosure of which is incorporated by reference herein in its entirety.

BACKGROUND

1. Field

The disclosure relates to a communication system. More particularly, the disclosure relates to a method of enhancing session continuity for a user equipment (UE) by transmitting a notification to a target application function (AF) when the target AF is changed as a local data network (DN) is changed due to a mobility of the UE.

2. Description of Related Art

In order to meet demand with respect to wireless data traffic, which is increasing due to the commercialization of the $4^{th}$ generation (4G) communication system, an improved $5^{th}$ generation (5G) communication system or pre-5G communication system has been developed. For this reason, the 5G communication system or the pre-5G communication system is called a beyond 4G network communication system or a post-long term evolution (LTE) system.

To achieve a high data rate, the implementation of the 5G communication system in an ultra-high-frequency millimeter wave (mmWave) band, for example, a 60 GHz band, is under consideration. In order to mitigate the path loss of radio waves and increase the transmission distance of radio waves in the ultra-high frequency band, beamforming, massive multiple input multiple output (MIMO), full dimensional MIMO (FD-MIMO), array antenna, analog beamforming, and large scale antenna techniques are being discussed in relation to the 5G communication system.

Furthermore, for the improvement of a system network, in the 5G communication system, technologies, such as advanced small cells, advanced small cells, a cloud radio access network (cloud RAN), an ultra-dense network, device to device communication (D2D), wireless backhaul, a moving network, cooperative communication, coordinated multi-points (CoMP), reception interference cancellation, or the like, have been developed.

In addition, in the 5G system, hybrid frequency shift keying (FSK) and quadrature amplitude modulation (QAM) (FQAM) and sliding window superposition coding (SWSC), which are advanced coding modulation (ACM) methods, and filter bank multi carrier (FBMC), non-orthogonal multiple access (NOMA), and sparse code multiple access (SCMA), which are advanced access techniques, are being developed.

In the 5G system, supporting various services compared with the existing 4G system is being considered. For example, the most representative services include enhanced mobile broad band (eMBB), ultra-reliable and low latency communication (URLLC), massive machine type communication (mMTC), and evolved multimedia broadcast/multicast service (eMBMS). In addition, a system providing the URLLC service may be referred to as a URLLC system, and a system providing an eMBB service may be referred to as an eMBB system. Furthermore, the terms "service" and "system" may be used interchangeably.

Among the above services, the URLLC service is a service that is newly considered in the 5G system, unlike the existing 4G system, and the service satisfies conditions, such as ultra-high reliability, for example, a packet error rate of about $10^{-5}$, and low latency, for example, about 0.5 msec, compared with other services. In order to satisfy these strict conditions, the URLLC service may need application of a transmission time interval (TTI) shorter than that of the eMBB service, and various operation methods utilizing the same are under consideration.

The Internet is evolving from a human-centered connection network where humans generate and consume information, to an Internet of Things (IoT) network where information is exchanged and processed between distributed components, such as things. Internet of Everything (IoE) technology, in which big data processing technology through a connection to a cloud server and the like is combined with the IoT technology, is also emerging. In order to implement the IoT, technical components, such as detection technology, wired/wireless communication and network infrastructure, service interface technology, and security technology are required. Recently, a sensor network, machine to machine (M2M) communication, machine type communication (MTC), or the like, for connection between things, are being studied.

In the IoT environment, intelligent Internet technology (IT) services that create new values in human life by collecting and analyzing data generated from connected things may be provided. The IoT may be applied to the fields of smart homes, smart buildings, smart cities, smart cars or connected cars, smart grids, health care, smart home appliances, advanced medical services, or the like, through fusion and convergence of existing information technology (IT) technology and various industries.

Accordingly, various attempts have been made to apply the 5G communication system to the IoT network. For example, technologies, such as a sensor network, M2M communication, MTC, or the like, are being implemented by the 5G communication technologies, such as beamforming, MIMO, array antennas, or the like. The use of the cloud RAN as the above-mentioned big data processing technology may be an example of the convergence of the 5G technology and the IoT technology.

As it is possible to provide various services according to the above descriptions and the development of a mobile communication system, in particular, a method of enhancing session continuity for a UE is needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for effectively providing services in a wireless communication system.

Additional aspects will be set forth in part in the description which follows and, in part, will be apparent from the description, or may be learned by practice of the presented embodiments.

In accordance with an aspect of the disclosure, a method performed by an application function (AF) in a wireless communication system is provided. The method includes receiving, from a session management function (SMF), a late notification message indicating a change of a data network access identifier (DNAI), identifying whether an AF change is needed based on the late notification message, and transmitting, to the SMF, a response message including information for change to a target AF for a target DNAI based on a result of identifying that the AF change is needed.

The response message includes at least one of an indication of the AF change, a target AF ID, or a notification target address of the target AF.

The transmitting of, to the SMF, the response message including the information for change to the target AF includes transmitting, to a network exposure function (NEF), the response message including at least one of an indication of the AF change, a target AF ID, or a notification target address of the target AF in case that the AF requests the late notification message via the NEF, and the response message is transmitted by the NEF to the SMF.

The transmitting of, to the SMF, the response message including the information for change to the target AF includes identifying whether an application relocation is completed successfully on time, and the response message includes a negative cause code in case that the application relocation is not completed successfully on time.

The identifying of whether the AF change is needed based on the late notification message includes identifying whether the target DNAI is served by the AF based on the late notification message, and identifying the target AF for the target DNAI in case that the target DNAI is not served by the AF.

The late notification message is transmitted to the target AF by the SMF based on the response message in case that the SMF receives the response message indicating the change to the target AF.

The late notification message includes the target DNAI of a protocol data unit (PDU) session.

In accordance with another aspect of the disclosure, a method performed by a SMF in a wireless communication system is provided. The method includes transmitting, to an AF, a late notification message indicating a change of a DNAI, and receiving, from the AF, a response message including information for change to a target AF for a target DNAI in case that an AF change is needed based on the late notification message.

The response message includes at least one of an indication of the AF change, a target AF ID, or a notification target address of the target AF.

The receiving of, from the AF, the response message including the information for change to the target AF includes receiving, from an NEF, the response message including at least one of an indication of the AF change, a target AF ID, or a notification target address of the target AF in case that the AF requests the late notification message via the NEF, and the response message is transmitted by the AF to the NEF.

The response message includes a negative cause code in case that an application relocation is not completed successfully on time.

The AF identifies, based on the late notification message, whether the AF is serving the target DNAI, and the AF identifies the target AF for the target DNAI in case that the AF is not serving the target DNAI.

The method further includes transmitting, to the target AF, the late notification message based on the response message in case that the SMF receives the response message indicating the change to the target AF.

The late notification message includes the target DNAI of a PDU session.

In accordance with another aspect of the disclosure, an AF in a wireless communication system is provided. The AF includes a transceiver, and at least one processor coupled with the transceiver and configured to receive, from a SMF, a late notification message indicating a change of a DNAI, identify whether an AF change is needed based on the late notification message, and transmit, to the SMF, a response message including information for change to a target AF for a target DNAI based on a result of identifying that the AF change is needed.

The response message includes at least one of an indication of the AF change, a target AF ID, or a notification target address of the target AF.

The at least one processor is configured to transmit, to an NEF, the response message including at least one of an indication of the AF change, a target AF ID, or a notification target address of the target AF in case that the AF requests the late notification message via the NEF, and the response message is transmitted by the NEF to the SMF.

The at least one processor is configured to identify whether an application relocation is completed successfully on time, and the response message includes a negative cause code in case that the application relocation is not completed successfully on time.

The at least one processor is configured to identify whether the target DNAI is served by the AF based on the late notification message, and identify the target AF for the target DNAI in case that the target DNAI is not served by the AF.

The late notification message is transmitted to the target AF by the SMF based on the response message in case that the SMF receives the response message indicating the change to the target AF.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
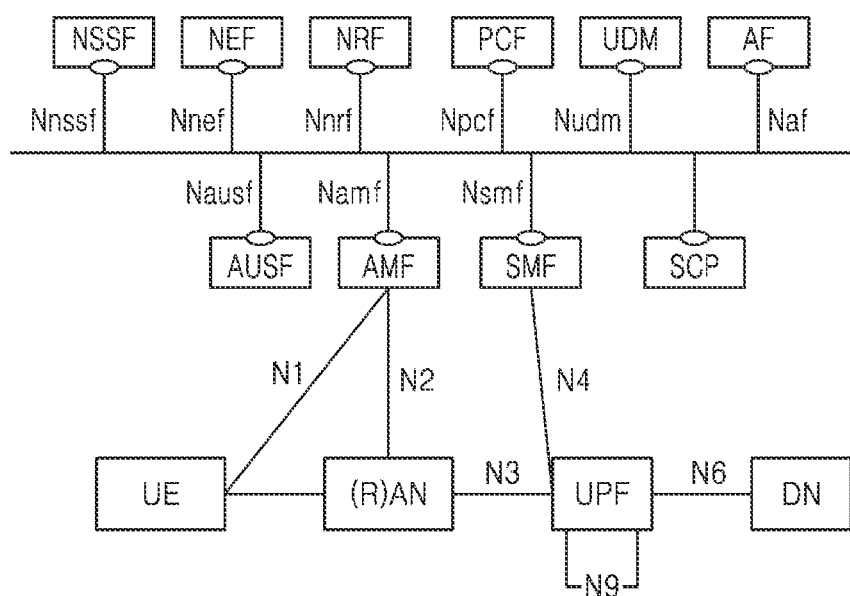
FIG. 1 is a diagram of a structure of a $5^{th}$ generation (5G) network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, each element illustrated in the drawings may be exaggerated, omitted, or schematically illustrated. Furthermore, the illustrated size of each element does not substantially reflect its actual size. In each drawing, the same or corresponding constituent elements are indicated by the same reference numerals.

The attached drawings for illustrating preferred embodiments of the disclosure are referred to in order to gain a sufficient understanding of the disclosure, the merits thereof, and the objectives accomplished by the implementation of the disclosure. This disclosure may, however, be embodied in many different forms and should not be construed as limited to the embodiments set forth herein. Rather, these embodiments are provided so that this disclosure will be thorough and complete, and will fully convey the scope of the disclosure to one of ordinary skill in the art. Throughout the specification, like reference numerals denote like constituent elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that blocks of flowcharts and combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

As used herein, the term "unit" means a software component or hardware component, such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Accordingly, for example, the term "unit" may refer to components, such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card.

As used herein, a base station is an entity for assigning resources to a UE, and examples thereof may include at least one of an eNode B, a Node B, a base station (BS), a wireless access unit, a base station controller, or a network node. Examples of a terminal may include a UE, an MS, a cellular phone, a smartphone, a computer, a multimedia system capable of performing a communication function, or the like. Furthermore, the embodiments of the disclosure may also be applied to other communication systems having similar technical backgrounds or channel types. Furthermore, the embodiments of the disclosure may also be applied to other communication systems through partial modification without greatly departing from the scope of the disclosure based on the judgment of one of ordinary skill in the art.

In the following description, terms used to identify an access node, terms used to indicate a network entity or network functions (NFs), terms used to indicate messages, terms used to indicate an interface between network entities, terms used to indicate various pieces of identification information are exemplified for convenience of explanation. Accordingly, the disclosure is not limited to the terms described below, and other terms that refer to objects having equivalent technical meanings can be used.

Hereinbelow, for convenience of explanation, terms and names defined in the $3^{rd}$ generation partnership project (3GPP) long term evolution (LTE) standard and/or the 3GPP new radio (NR) standard may be partially used. However, the disclosure is not limited by the terms and names, and can be applied to systems conforming to other standards.

The embodiments of the disclosure disclose methods of enhancing session continuity for a UE by providing a notification to a target application function (AF), that is, a new AF responsible for a changed local DN when a user plane function (UPF) relocation occurs due to a movement of the UE, and thus a data network access identifier (DNAI) is changed and the local DN of the changed DNAI is changed. The disclosure will now be described more fully with reference to the accompanying drawings, in which embodiments of the disclosure are shown.

FIG. 1 is a diagram of a structure of a $5^{th}$ generation (5G) network according to an embodiment of the disclosure. A network entity or network nodes forming a 5G network are described below.

Referring to FIG. 1, a (radio) access network ((R)AN) is a subject that performs assignment of wireless resources of a UE, and may be at least one of a eNode B, a gNode B, a Node B, a base station (BS), a next generation radio access network (NG-RAN), 5G-AN, a wireless access unit, a base station controller, or a node on a network. A terminal may be at least one of a UE, a next generation (NG) UE, an MS, a cellular phone, a smartphone, or a computer. Furthermore, the terminal may include a multimedia system capable of performing communication function. Although the embodiments of the disclosure are described with an example of a 5G system, the embodiments of the disclosure may also be applied to other communication systems having similar technical backgrounds. Furthermore, the embodiments of the disclosure may also be applied to other communication systems through partial modification without greatly departing from the scope of the disclosure based on the judgment of one of ordinary skill in the art.

While evolving from the $4^{th}$ generation (4G) system to the 5G system, the wireless communication system defines a new core network, that is, a Next Generation (NG) core or 5G core (5GC) network. In a new core network, all legacy network entities (NEs) are virtualized to become a network function (NF). According to an embodiment of the disclosure, the network function may mean a network entity, a network component, or a network resource.

According to an embodiment of the disclosure, 5GC may include NFs illustrated in FIG. 1. The disclosure is not limited to the illustration of FIGS. 1, and 5GC may include more NFs than the NFs illustrated in FIG. 1 or may include fewer NFs than the NFs illustrated in FIG. 1.

According to an embodiment of the disclosure, an access and mobility management function (AMF) may be a network function to manage mobility of a UE.

According to an embodiment of the disclosure, a session management function (SMF) may be a network function to manage a packet data network (PDN) connection provided to a UE. The PDN connection may be stored in the name of a protocol data unit (PDU) session.

According to an embodiment of the disclosure, a policy control function (PCF) may be a network function to apply a service policy, a charging policy, and a PDU session policy of a mobile communication provider with respect to a UE.

According to an embodiment of the disclosure, a unified data management (UDM) may be a network function to store information about a subscriber.

According to an embodiment of the disclosure, a network exposure function (NEF) may be a function to provide information about a UE to a server outside the 5G network. Furthermore, the NEF may provide a function to provide information necessary for a service to the 5G network and store the information in a unified data repository (UDR).

According to an embodiment of the disclosure, the UPF may be a function to perform a gateway function to transmit user data (PDU) to a data network (DN).

According to an embodiment of the disclosure, a network repository function (NRF) may perform a function to discover a NF.

According to an embodiment of the disclosure, an authentication server function (AUSF) may perform UE authentication in a 3GPP access network and a non-3GPP access network.

According to an embodiment of the disclosure, a network slice selection function (NSSF) may perform a function to select a network slice instance provided to the UE.

According to an embodiment of the disclosure, the DN may be a data network in which the UE transceives data to use services of a network service provider or $3^{rd}$ party services.

Figure 2:
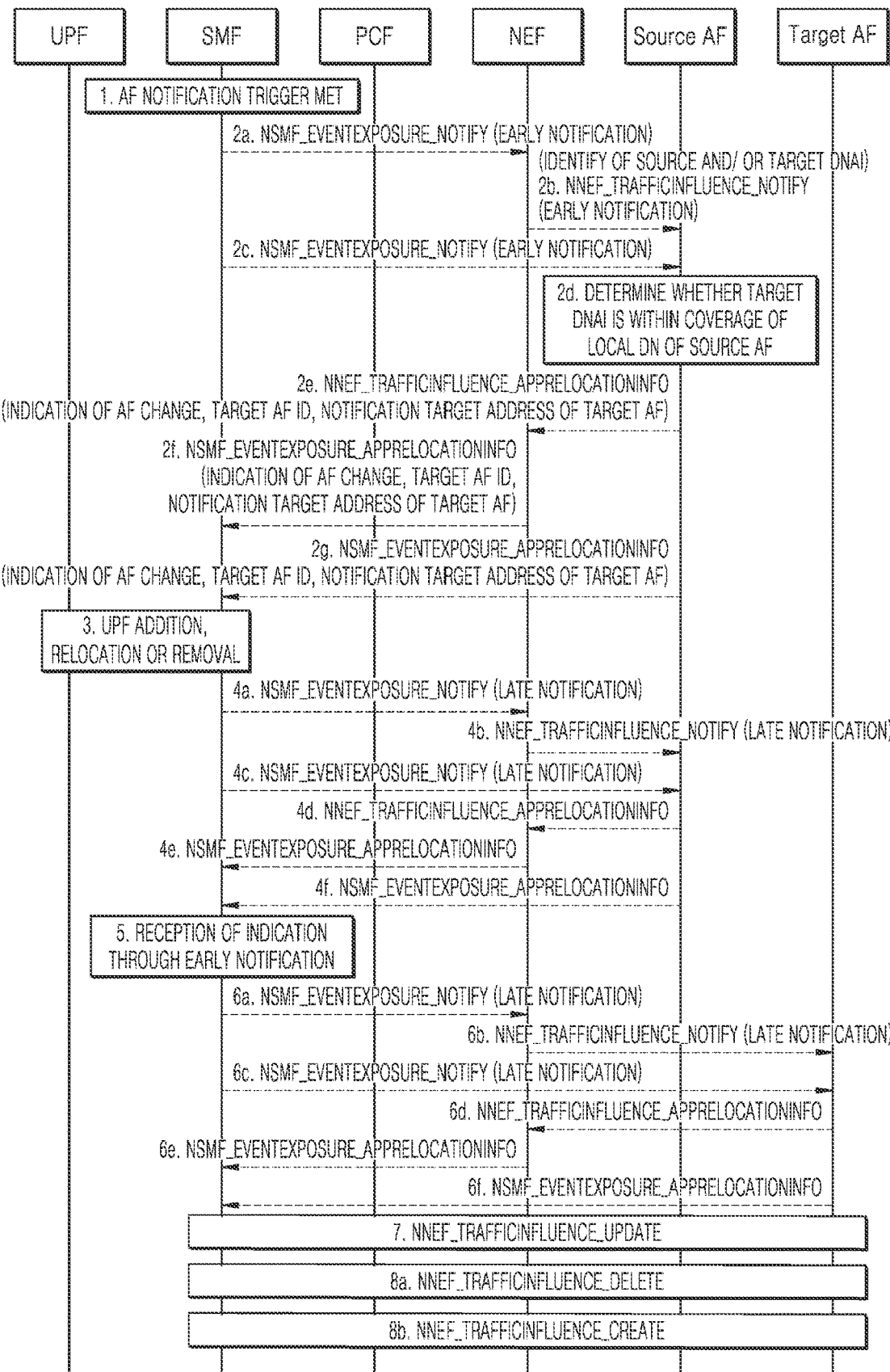
FIG. 2 is a diagram of a configuration of transmitting, by a session management function (SMF), an early/late notification to a target application function (AF) when user plane management events occur according to an embodiment of the disclosure.

FIG. 2 is a diagram of a configuration of transmitting, by an SMF, an early/late notification to an AF when user plane management events occur according to an embodiment of the disclosure. More particularly, in FIG. 2, provided is a method in which, when an AF requests both of an early notification and a late notification, a source AF notifies an SMF of a change of the AF that is responsible for a local DN according to a DNAI change by using the two notifications, and the SMF transmits a notification to a target AF.

Referring to FIG. 2, in stage 1, the SMF may detect generation of a user plane management event where an AF notification is generated (that is, a condition to trigger an AF notification is satisfied). Examples of a user plane management event are as follows.

Generation and removal of a PDU session anchor (PSA) DNAI change

Ethernet PSA Relocation

Other events that an AF requests through a notification subscription request

Stages 2a and 2b show a configuration of transmitting, by an SMF, an early notification to an AF via a NEF when the AF requests an AF notification via the NEF, for example, via AF request (notification subscription) before stage 1. When, in stage 1, the SMF detects a user plane management event, in stage 2a, the SMF may transmit an early notification to an NEF of a target DNAI of a PDU session by using an Nsmf_EventExposure_Notify service operation. An Nsmf_EventExposure_Notify message may include at least one piece of information of an AF transaction internal ID, a type of a notification, i.e., an early notification or a late notification, identity of a source DNAI and/or identity of a target DNAI, an IP address/prefix or media access control (MAC) address of a UE, or generic public subscription identifier (GPSI) or N6 traffic routing information.

In stage 2b, when receiving the Nsmf_EventExposure_Notify message, the NEF may perform a configuration of information mapping, for example, mapping between an AF transaction internal ID and an AF transaction ID, mapping between SUPI and GPSI, or the like, and transmit, to an appropriate AF, an Nnef_TrafficInfluence_Notify message including the information received from the SMF.

Stage 2c shows a configuration of transmitting, by the SMF, an early notification to the AF when the AF requests an AF notification, not via the NEF, for example, requested before stage 1 via an AF request (notification subscription). When, in stage 1, the SMF detects a user plane management event, in stage 2c the SMF may transmit an early notification to the AF of the target DNAI of the PDU session by using the Nsmf_EventExposure_Notify service operation. The Nsmf_EventExposure_Notify message may include at least one piece of information of an AF transaction internal ID, a type of a notification, i.e., an early notification or a late notification, identity of a source DNAI and/or identity of a target DNAI, an IP address/prefix or MAC address of a UE, or GPSI or N6 traffic routing information.

According to an embodiment of the disclosure, stages 2a and 2b may be performed optionally with stage 2c. For example, stage 2c may be performed when the AF requests an AF notification, not via the NEF, for example, through an AF request (notification subscription), and otherwise stages 2a and 2b may be performed. In the following description of the disclosure, the configuration in which the "AF requests AF notification via the NEF, for example, requested through the AF request (notification subscription)" and the configuration in which the "AF requests AF notification, not via the NEF, for example, requested through the AF request (notification subscription) may be optionally performed as described regarding stages 2a, 2b, and 2c.

In stage 2d, the AF having received an early notification may identify the ID of a target DNAI and determine whether the target DNAI is within a coverage of a local DN for which the AF is responsible. When the target DNAI is out of the coverage of the local DN for which the AF is responsible, the AF may identify a new AF that is responsible for a new local DN, that is, the target AF, and perform an AF migration configuration as the target AF. Through the above configuration, the AF may perform application relocation to the target AF and transmit, to the target AF, AF notification subscription information, user information, and UE information (i.e., application information, account information, or the like).

Stages 2e and 2f show a configuration of transmitting, by the AF, a response to the early notification to the SMF via NEF when the AF requests an AF notification via the NEF. In stage 2e, the AF may transmit a response to the Nnef_TrafficInfluence_Notify message, to the NEF, by using a Nnef_TrafficInfluence_AppRelocationInfo service operation. When, in stage 2d, the target DNAI is within the coverage of the local DN for which the AF is responsible, the AF may transmit a Nnef_TrafficInfluence_AppRelocationInfo message, to the NEF, immediately or after performing application relocation needed as the target DNAI. The Nnef_TrafficInfluence_AppRelocationInfo message may include N6 traffic routing information toward the target DNAI. Furthermore, the AF may transmit a positive or negative response. When the AF is unable to perform application relocation in time, the AF may include a negative cause code in the Nnef_TrafficInfluence_AppRelocationInfo message. When, in stage 2d, the target DNAI is out of the coverage of the local DN for which the AF is responsible, the AF may notify the SMF of an indication indicating that an AF change is necessary, the ID of the target AF responsible for the target local DN to which the target DNAI belongs, and an address of the target AF to which a message is transmitted. To this end, the AF may transmit, to the NEF, the Nnef_TrafficInfluence_AppRelocationInfo message including at least one piece of information of an indication of an AF change, a target AF ID, or a notification target address of a target AF.

In stage 2f, when receiving the Nnef_TrafficInfluence_AppRelocationInfo message, the NEF may transmit, to an appropriate SMF, an Nsmf_EventExposure_AppRelocationInfo message including the information received from the AF.

Stage 2g shows a configuration of transmitting, by the AF, a response to the early notification to the SMF when the AF requests an AF notification, not via the NEF. The AF may transmit a response to the Nsmf_EventExposure_Notify message, to the SMF, by using an Nsmf_EventExposure_AppRelocationInfo service operation. When, in stage 2d, the target DNAI is within the coverage of the local DN for which the AF is responsible, the AF may transmit the Nsmf_EventExposure_AppRelocationInfo message, to the SMF, immediately or after performing application relocation needed as the target DNAI. The Nsmf_EventExposure_AppRelocationInfo message may include the N6 traffic routing information toward the target DNAI. Furthermore, the AF may transmit a positive or negative response. When the AF is unable to perform application relocation in time, the AF may include a negative cause code in the Nsmf_EventExposure_AppRelocationInfo message. When, in stage 2d, the target DNAI is out of the coverage of the local DN for which the AF is responsible, the AF may notify the SMF of an indication indicating that an AF change is necessary, the ID of the target AF responsible for the target local DN to which the target DNAI belongs, and an address of the target AF to which a message is transmitted. To this end, the AF may transmit, to the SMF, the Nsmf_EventExposure_AppRelocationInfo message including at least one piece of information of an indication of an AF change, a target AF ID, or a notification target address of the target AF.

In stage 3, the SMF may perform a removal, change, and addition of the UPF, or a change of the DNAI. When runtime coordination is set between the 5GC and the AF, according to an "AF acknowledgment to be expected" indication included in the AF request message, the SMF may wait for a response to the early notification from the AF before performing stage 3, and may not perform stage 3 until a positive response is received from the AF.

Stages 4a to 4f show a configuration of transmitting, by the SMF, a late notification when, in stage 2d, the target DNAI is within the coverage of the local DN for which the AF, which joins or subscribes to a notification service, is responsible, that is, when no AF change occurs. Once at least one of stages 4a to 4f is performed, the configurations after stage 5 may be omitted. When an AF change occurs, the configurations of stages 4a to 4f may be omitted and the configurations after stage 5 may be performed.

Stages 4a and 4b show a configuration of transmitting, by the SMF, a late notification to the AF via the NEF when the AF requests an AF notification via the NEF. When the SMF detects a user plane management event in stage 1, and the SMF performs the removal, change, and addition of the UPF, or the change of the DNAI in stage 3, in stage 4a, the SMF may transmit a late notification to the NEF of the target DNAI of the PDU session by using the Nsmf_EventExposure_Notify service operation. The Nsmf_EventExposure_Notify message may include at least one piece of information of an AF transaction internal ID, a type of a notification, i.e., an early notification or a late notification, identity of a source DNAI and/or identity of a target DNAI, an IP address/prefix or MAC address of a UE, or GPSI or N6 traffic routing information. When runtime coordination is set between the 5GC and the AF, according to the "AF acknowledgment to be expected" indication included in the AF request message, the SMF may wait for a response to the late notification from the AF, and may not transmit data through a new UP path until a positive response is received from the AF.

In stage 4b, when receiving the Nsmf_EventExposure_Notify message, the NEF performs a configuration of information mapping, for example, mapping between an AF transaction internal ID and an AF transaction ID, mapping between SUPI and GPSI, or the like, and transmits, to an appropriate AF, the Nnef_TrafficInfluence_Notify message including the information received from the SMF.

Stage 4c shows a configuration of transmitting, by the SMF, a late notification to the AF when the AF requests an AF notification, not via the NEF. When the SMF detects a user plane management event in stage 1, and the SMF performs the removal, change, and addition of the UPF, or the change of the DNAI in stage 3, in stage 4c, the SMF may transmit a late notification to the AF of the target DNAI of the PDU session by using the Nsmf_EventExposure_Notify service operation. The Nsmf_EventExposure_Notify message may include at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information.

Stages 4d and 4e show a configuration of transmitting, by the AF, a response to the late notification to the SMF via the NEF when the AF requests an AF notification via the NEF. In stage 4d, the AF may transmit a response to the Nnef_TrafficInfluence_Notify message, to the NEF, by using the Nnef_TrafficInfluence_AppRelocationInfo service operation. When, in stage 2d, the target DNAI is within the coverage of the local DN for which the AF is responsible, the AF may transmit the Nnef_TrafficInfluence_AppRelocationInfo message, to the NEF, immediately or after performing application relocation needed as the target DNAI. The Nnef_TrafficInfluence_AppRelocationInfo message may include N6 traffic routing information toward the target DNAI. Furthermore, the AF may transmit a positive or negative response. When the AF is unable to perform application relocation in time, the AF may include a negative cause code in the Nnef_TrafficInfluence_AppRelocationInfo message.

In stage 4e, when receiving the Nnef_TrafficInfluence_AppRelocationInfo message, the NEF may transmit, to an appropriate SMF, the Nsmf_EventExposure_AppRelocationInfo message including the information received from the AF.

Stage 4f shows a configuration of transmitting, by the AF, a response to the late notification, to the SMF, when the AF requests an AF notification, not via the NEF. The AF may transmit a response to the Nsmf_EventExposure_Notify message, to the SMF, by using the Nsmf_EventExposure_AppRelocationInfo service operation. When, in stage 2d, the target DNAI is within the coverage of the local DN for which the AF is responsible, the AF may transmit the Nsmf_EventExposure_AppRelocationInfo message, to the SMF, immediately or after performing application relocation needed as the target DNAI. The Nsmf_EventExposure_AppRelocationInfo message may include the N6 traffic routing information toward the target DNAI. Furthermore, the AF may transmit a positive or negative response. When the AF is unable to perform application relocation in time, the AF may include a negative cause code in the Nsmf_EventExposure_AppRelocationInfo message.

Stage 5 shows a configuration of transmitting, by the SMF, a late notification when SMF receives, as a response to the early notification, a response including information, for example, at least one of an indication of an AF change, a target AF ID, or a notification target address of the target AF, indicating that the target DNAI is out of the coverage of the local DN for which the AF, which joins or subscribes to a notification service, is responsible, that is, an AF change is necessary. When the configuration of stage 5 is performed, the configuration of the preceding stages 4a to 4f may not be performed.

Stage 6a and 6b show a configuration of transmitting, by the SMF, a late notification to the target AF via the NEF when the AF requests an AF notification via the NEF. In the transceiving process of an early notification, when the SMF receives, through a message response to the early notification, an indication that an AF change is necessary, in stage 6a the SMF may transmit a late notification to the NEF of the target DNAI of the PDU session by using the Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also information about the target AF (an indication of an AF change, a target AF ID, or a notification target address of the target AF) included in the received early notification response message. When runtime coordination is set between the 5GC and the AF, according to the "AF acknowledgment to be expected" indication included in the AF request message, the SMF may wait for a response to the late notification from the AF, and may not transmit data through a new UP path until a positive response is received from the AF.

In stage 6b, when receiving the Nsmf_EventExposure_Notify message, the NEF may perform a configuration of information mapping, for example, mapping between an AF transaction internal ID and an AF transaction ID, mapping between SUPI and GPSI, or the like, and a configuration of setting the information about the target AF within the NEF, and may transmit, to the target AF, the Nnef_TrafficInfluence_Notify message including the information received from the SMF.

Stage 6c shows a configuration of transmitting, by the SMF, a late notification to the AF when the AF requests an AF notification, not via the NEF. In the transceiving process of an early notification, when the SMF receives, through a message response to the early notification, an indication that an AF change is necessary, in stage 6c, the SMF may transmit a late notification to the target AF of the target DNAI of the PDU session based on the information about the target AF (an indication of an AF change, a target AF ID, or a notification target address of the target AF) that received from the early notification response message by using the Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also the information about the target AF (an indication of an AF change, a target AF ID, or a notification target address of the target AF) included in the received early notification response message.

Stages 6d and 6e show a configuration of transmitting, by the AF, a response to the late notification to the SMF via the NEF when the AF requests an AF notification via the NEF. In stage 6d, the AF may transmit a response to the Nnef_TrafficInfluence_Notify message, to the NEF, by using the Nnef_TrafficInfluence_AppRelocationInfo service operation. The target AF may transmit the Nnef_TrafficInfluence_AppRelocationInfo message, to the NEF, immediately or after performing application relocation needed as the target DNAI. The Nnef_TrafficInfluence_AppRelocationInfo message may include N6 traffic routing information toward the target DNAI. Furthermore, the target AF may transmit a positive or negative response. When the target AF is unable to perform application relocation in time, the target AF may include a negative cause code in the Nnef_TrafficInfluence_AppRelocationInfo message.

In stage 6e, when receiving the Nnef_TrafficInfluence_AppRelocationInfo message, the NEF may transmit, to an appropriate SMF, the Nsmf_EventExposure_AppRelocationInfo message including the information received from the target AF.

Stage 6f shows a configuration of transmitting, by the target AF, a response to the late notification, to the SMF, when the AF requests an AF notification, not via the NEF, or when the target AF receives an AF notification, not via the NEF. The target AF may transmit a response to the Nsmf_EventExposure_Notify message, to the SMF, by using the Nsmf_EventExposure_AppRelocationInfo service operation. The target AF may transmit the Nsmf_EventExposure_AppRelocationInfo message, to the SMF, immediately or after performing application relocation needed as the target DNAI. The Nsmf_EventExposure_AppRelocationInfo message may include the N6 traffic routing information toward the target DNAI. Furthermore, the target AF may transmit a positive or negative response. When the target AF is unable to perform application relocation in time, the target AF may include a negative cause code in the Nsmf_EventExposure_AppRelocationInfo message.

The configurations of stages 7 to 8b relate to the change of the existing user plane management event subscription information of the source AF, to subscription information of a changed target AF, when an AF change occurs as the local DN is changed according to a DNAI change. A subscription information changing method may include two methods: a method of updating, by the target AF, the existing subscription information, as in stage 7, and a method of erasing, by the source AF, the existing subscription information and performing, by the target AF, a new subscription, as in stages 8a and 8b. Of stages 7 to 8b, only stage 7 may be performed or only stages 8a and 8b may be performed. Furthermore, the configurations of stages 7 to 8b may be omitted depending on the situation.

Figure 3:
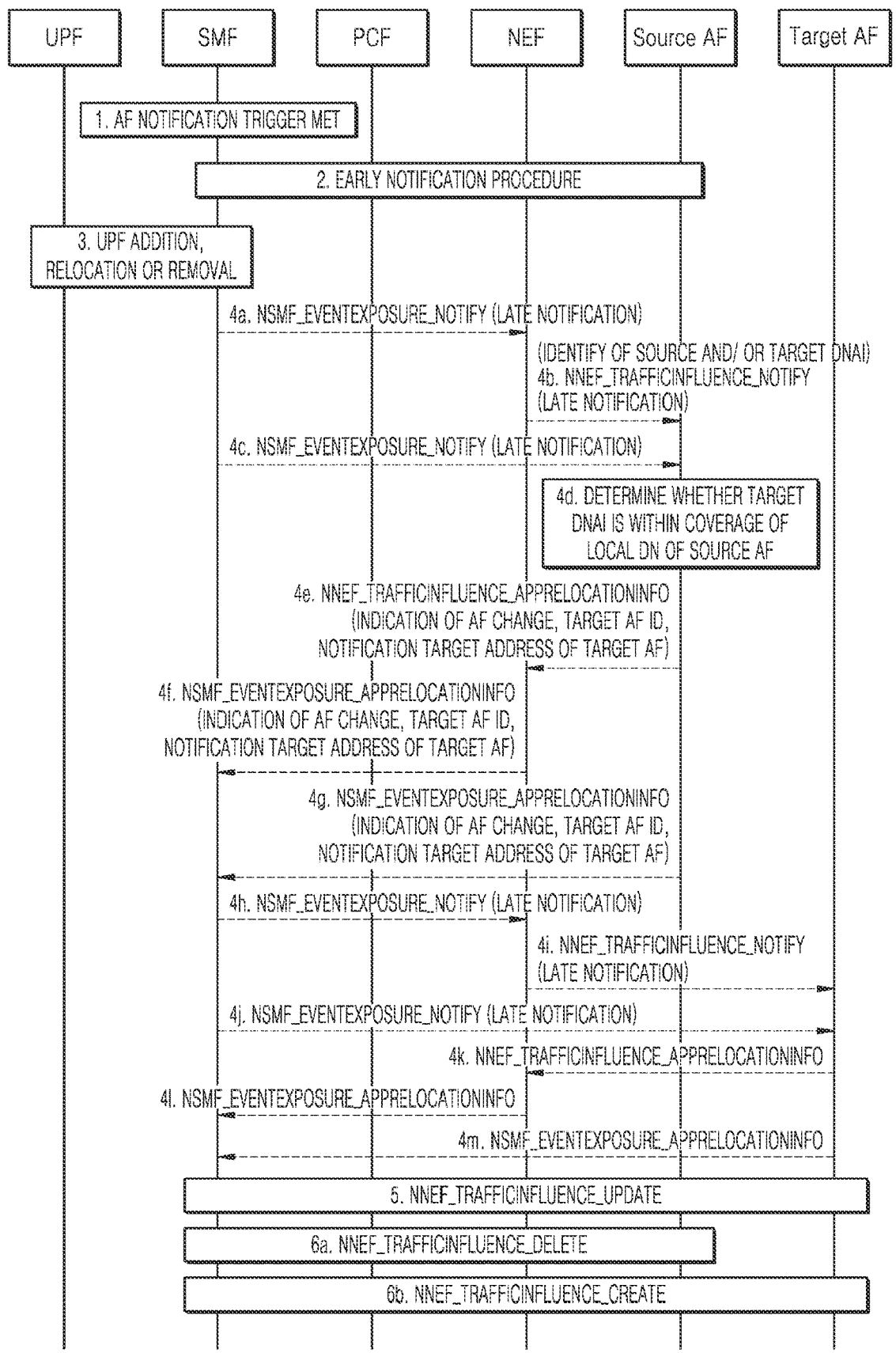
FIG. 3 is a diagram of a configuration of transmitting, by an SMF, a late notification to an AF when user plane management events occur according to an embodiment of the disclosure.

FIG. 3 is a diagram of a configuration of transmitting, by an SMF, a late notification to an AF when user plane management events occur according to an embodiment of the disclosure. More particularly, in FIG. 3, provided is a method, in which, when the AF requests a late notification, the source AF notifies a change of the AF responsible for the local DN according to a DNAI change, to the SMF, by using a late notification, and the SMF transmits a notification to the target AF.

Referring to FIG. 3, in stage 1, the SMF may detect generation of a user plane management event when an AF notification is generated (that is, a condition to trigger the AF notification is satisfied). Examples of a user plane management event are as follows.

Generation and removal of a PDU session anchor (PSA)
DNAI change
Ethernet PSA Relocation
Other events that an AF requests through a notification subscription request Stage 2 is performed when, in stage 1, the SMF detects a user plane management event and the AF requests an early notification. However, in FIG. 3, a case in which the AF requests only a late notification is described. In other words, in FIG. 3, stage 2 may be omitted.

In stage 3, when a user plane management event is detected in stage 1, the SMF may perform the removal, change, and addition of the UPF, or the change of the DNAI. When runtime coordination is set between the 5GC and the AF and the AF requests an early notification, according to the "AF acknowledgment to be expected" indication included in the AF request message, the SMF may wait for a response to the early notification from the AF before performing stage 3, and may not perform stage 3 until a positive response is received from the AF.

In FIG. 3, when the target DNAI is out of the coverage of the local DN for which the AF, which subscribes to a notification service, is responsible (see stage 4d), that is, when an AF change occurs, only a configuration of transmitting a late notification is described. A configuration of transmitting a late notification when no AF change occurs may be described with reference to stages 4a to 4f of FIG. 2.

Stages 4a and 4b show a configuration of transmitting, by the SMF, a late notification to the AF via the NEF when the AF requests an AF notification via the NEF. When the SMF detects a user plane management event in stage 1, and the SMF performs the removal, change, and addition of the UPF, or the change of the DNAI in stage 3, in stage 4a, the SMF may transmit a late notification to the NEF of the target DNAI of the PDU session by using the Nsmf_EventExposure_Notify service operation. The Nsmf_EventExposure_Notify message may include at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information. When runtime coordination is set between the 5GC and the AF, according to the "AF acknowledgment to be expected" indication included in the AF request message, the SMF may wait for a response to the late notification from the AF, and may not transmit data through a new UP path until a positive response is received from the AF.

In stage 4b, when receiving the Nsmf_EventExposure_Notify message, the NEF performs a configuration of information mapping, for example, mapping between an AF transaction internal ID and an AF transaction ID, mapping between SUPI and GPSI, or the like, and transmits, to an appropriate AF, the Nnef_TrafficInfluence_Notify message including the information received from the SMF.

Stage 4c shows a configuration of transmitting, by the SMF, a late notification to the AF when the AF requests an AF notification, not via the NEF. When the SMF detects a user plane management event in stage 1, and the SMF performs the removal, change, and addition of the UPF, or the change of the DNAI in stage 3, in stage 4c, the SMF may transmit a late notification to the AF of the target DNAI of the PDU session by using the Nsmf_EventExposure_Notify service operation. The Nsmf_EventExposure_Notify message may include at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information.

In stage 4d, the AF that has received the late notification may check the ID of the target DNAI and determine whether the target DNAI is within the coverage of the local DN for which the AF is responsible. When the target DNAI is out of the coverage of the local DN for which the AF is responsible, the AF may identify a new AF that is responsible for a new local DN, that is, the target AF, and perform an AF migration configuration as the target AF. Through the above configuration, the AF may perform application relocation to the target AF and transmit, to the target AF, AF notification subscription information, user information, and UE information (application information, account information, or the like).

Stages 4e and 4f show a configuration of transmitting, by the AF, a response to the late notification to the SMF via the NEF when the AF requests an AF notification via the NEF. In stage 4e, the AF may transmit a response to the Nnef_TrafficInfluence_Notify message, to the NEF, by using the Nnef_TrafficInfluence_AppRelocationInfo service operation. When, in stage 4d, the target DNAI is within the coverage of the local DN for which the AF is responsible, the AF may transmit the Nnef_TrafficInfluence_AppRelocationInfo message, to the NEF, immediately or after performing application relocation needed as the target DNAI. The Nnef_TrafficInfluence_AppRelocationInfo message may include N6 traffic routing information toward the target DNAI. Furthermore, the AF may transmit a positive or negative response. When the AF is unable to perform application relocation in time, the AF may include a negative cause code in the Nnef_TrafficInfluence_AppRelocationInfo message. When, in stage 4d, the target DNAI is out of the coverage of the local DN for which the AF is responsible, the AF may notify, to the SMF, an indication indicating that an AF change is necessary, the ID of the target AF responsible for the target local DN to which the target DNAI belongs, and an address of the target AF to which a message is transmitted. To this end, the AF may transmit, to the NEF, the Nnef_TrafficInfluence_AppRelocationInfo message including at least one piece of information of an indication of an AF change, a target AF ID, or a notification target address of the target AF, a target AF ID, or a notification target address of a target AF.

In stage 4f, when receiving the Nnef_TrafficInfluence_AppRelocationInfo message, the NEF may transmit, to an appropriate SMF, the Nsmf_EventExposure_AppRelocationInfo message including the information received from the AF.

Stage 4g shows a configuration of transmitting, by the AF, a response to the late notification, to the SMF, when the AF requests an AF notification, not via the NEF. The AF may transmit a response to the Nsmf_EventExposure_Notify message, to the SMF, by using the Nsmf_EventExposure_AppRelocationInfo service operation. When, in stage 4d, the target DNAI is within the coverage of the local DN for which the AF is responsible, the AF may transmit the Nsmf_EventExposure_AppRelocationInfo message, to the SMF, immediately or after performing application relocation needed as the target DNAI. The Nsmf_EventExposure_AppRelocationInfo message may include the N6 traffic routing information toward the target DNAI. Furthermore, the AF may transmit a positive or negative response. When the AF is unable to perform application relocation in time, the AF may include a negative cause code in the Nsmf_EventExposure_AppRelocationInfo message. When, in stage 4d, the target DNAI is out of the coverage of the local DN for which the AF is responsible, the AF may notify, to the SMF, an indication indicating that an AF change is necessary, the ID of the target AF responsible for the target local DN to which the target DNAI belongs, and an address of the target AF to which a message is transmitted. To this end, the AF may transmit, to the SMF, the Nsmf_EventExposure_AppRelocationInfo message including at least one piece of information of an indication of an AF change, a target AF ID, or a notification target address of the target AF, a target AF ID, or a notification target address of the target AF.

Stages 4h and 4i show a configuration of transmitting, by the SMF, a late notification to the target AF via the NEF when the AF requests an AF notification via the NEF. When, in the previous stage of transceiving a late notification, the SMF receives an indication that an AF change is necessary, through a response message to the late notification, in stage 4h, the SMF may transmit a late notification to the NEF of the target DNAI of the PDU session by using the Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also the information about the target AF (an indication of an AF change, a target AF ID, or a notification target address of the target AF) included in the received late notification response message. When runtime coordination is set between the 5GC and the AF, according to the "AF acknowledgment to be expected" indication included in the AF request message, the SMF may wait for a response to the late notification from the AF, and may not transmit data through a new UP path until a positive response is received from the AF.

In stage 4i, when receiving the Nsmf_EventExposure_Notify message, the NEF may perform a configuration of information mapping, for example, mapping between an AF transaction internal ID and an AF transaction ID, mapping between SUPI and GPSI, or the like, and a configuration of setting the information about the target AF within the NEF, and may transmit, to the target AF, the Nnef_TrafficInfluence_Notify message including the information received from the SMF.

Stage 4j shows a configuration of transmitting, by the SMF, a late notification to the target AF when the AF requests an AF notification, not via the NEF. When, in the previous stage of transceiving a late notification, the SMF receives an Indication that an AF change is necessary, through a response message to the late notification, in stage 4j, the SMF may transmit a late notification to the target AF of the target DNAI of the PDU session based on the information about the target AF (an indication of an AF change, a target AF ID, or a notification target address of the target AF) received from the late notification response message, by using the Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also the information about the target AF (an indication of an AF change, a target AF ID, or a notification target address of the target AF) included in the received late notification response message.

Stage 4k and 4l show a configuration of transmitting, by the target AF, a response to the late notification to the SMF via the NEF when the AF requests an AF notification via the NEF. In stage 4k, the target AF may transmit a response to the Nnef_TrafficInfluence_Notify message, to the NEF, by using the Nnef_TrafficInfluence_AppRelocationInfo service operation. The target AF may transmit the Nnef_TrafficInfluence_AppRelocationInfo message, to the NEF, immediately or after performing application relocation needed as the target DNAI. The Nnef_TrafficInfluence_AppRelocationInfo message may include N6 traffic routing information toward the target DNAI. Furthermore, the target AF may transmit a positive or negative response. When the target AF is unable to perform application relocation in time, the target AF may include a negative cause code in the Nnef_TrafficInfluence_AppRelocationInfo message.

In stage 4l, when receiving the Nnef_TrafficInfluence_AppRelocationInfo message, the NEF may transmit, to an appropriate SMF, the Nsmf_EventExposure_AppRelocationInfo message including the information received from the target AF.

Stage 4m shows a configuration of transmitting, by the target AF, a response to the late notification, to the SMF, when the AF requests an AF notification, not via the NEF, or when the target AF receives an AF notification, not via the NEF. The target AF may transmit a response to the Nsmf_EventExposure_Notify message, to the SMF, by using the Nsmf_EventExposure_AppRelocationInfo service operation. The target AF may transmit the Nsmf_EventExposure_AppRelocationInfo message, to the SMF, immediately or after performing application relocation needed as the target DNAI. The Nsmf_EventExposure_AppRelocationInfo message may include the N6 traffic routing information toward the target DNAI. Furthermore, the target AF may transmit a positive or negative response. When the target AF is unable to perform application relocation in time, the target AF may include a negative cause code in the Nsmf_EventExposure_AppRelocationInfo message.

The configurations of stages 5 to 6b relate to the change of the existing user plane management event subscription information of the source AF, to subscription information of a changed target AF, when an AF change occurs as the local DN is changed according to a DNAI change. A subscription information changing method may include two methods: a method of updating, by the target AF, the existing subscription information, as in stage 5, and a method of erasing, by the source AF, the existing subscription information and performing, by the target AF, a new subscription, as in stages 6a and 6b. Of stages 5 to 6b, only stage 5 may be performed or only stages 6a and 6b may be performed. Furthermore, the configurations of stages 5 to 6b may be omitted.

Figure 4:
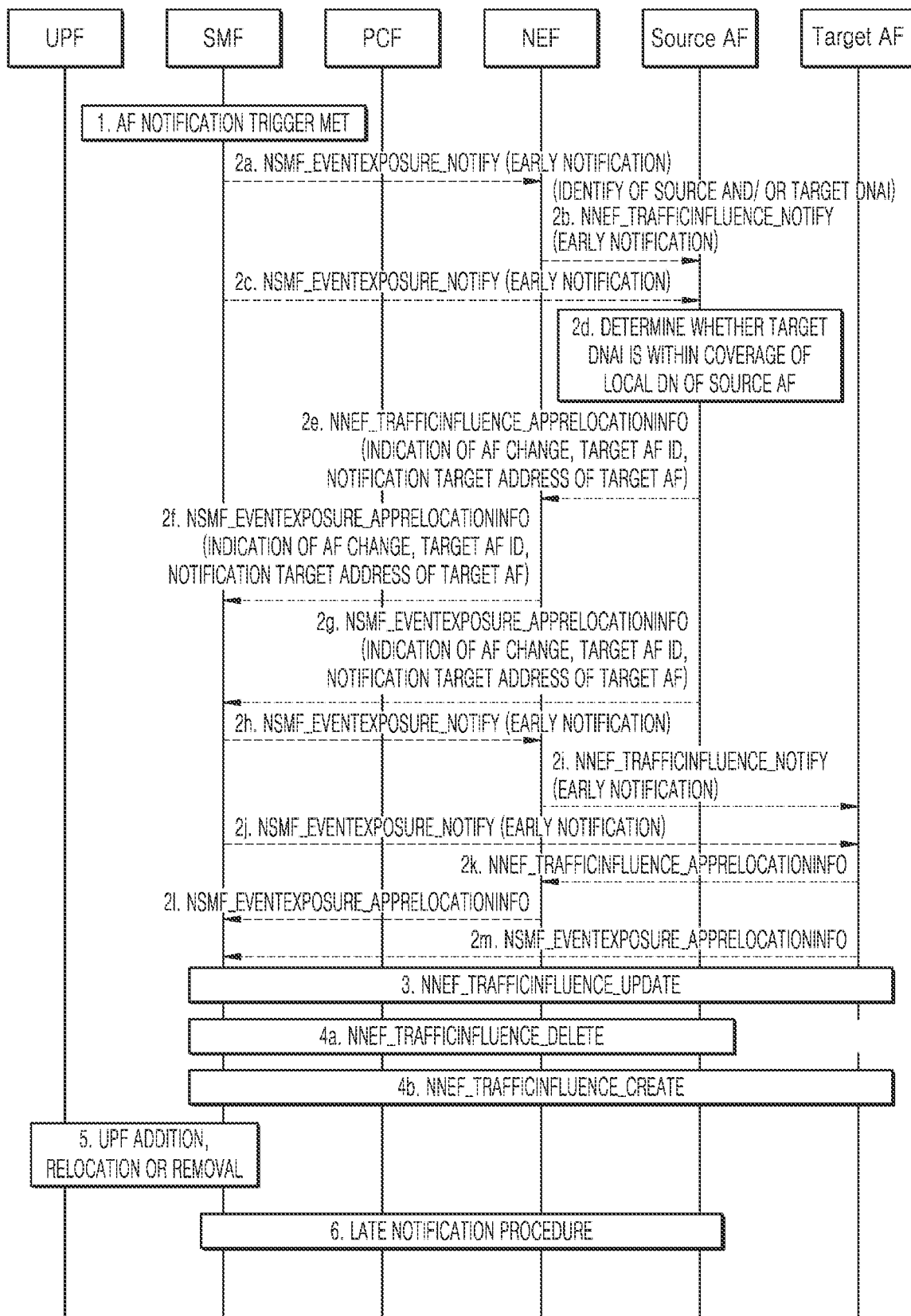
FIG. 4 is a diagram of a configuration of transmitting, by an SMF, an early notification to a target AF when user plane management events occur according to an embodiment of the disclosure.

FIG. 4 is a diagram of a configuration of transmitting, by an SMF, an early notification to a target AF when user plane management events occur according to an embodiment of the disclosure. More particularly, in FIG. 4, provided is a method of notifying, by the source AF, a change of the AF responsible for the local DN according to a DNAI change, to the SMF, by using the early notification configuration, and transmitting, by the SMF, a notification to the target AF, when the AF requests an early notification.

Referring to FIG. 4, in stage 1, the SMF may detect generation of a user plane management event when an AF notification is generated (that is, a condition to trigger the AF notification is satisfied). Examples of a user plane management event are as follows.

Generation and removal of a PDU session anchor (PSA)
DNAI change
Ethernet PSA Relocation
Other events that an AF requests through a notification subscription request In FIG. 4, when the target DNAI is out of the coverage of the local DN for which the AF, which subscribes to a notification service (see stage 2d), is responsible, that is, when an AF change occurs, only a configuration of transmitting an early notification is described. When no AF change occurs, an early notification transmitting configuration may be described with reference to stages 2a to 2g of FIG. 2.

Stages 2a and 2b show a configuration of transmitting, by the SMF, an early notification to the AF via the NEF, when the AF requests an AF notification via the NEF. When, in stage 1, the SMF detects a user plane management event, in stage 2a, the SMF may transmit an early notification to the NEF of the target DNAI of the PDU session by using an Nsmf_EventExposure_Notify service operation. The Nsmf_EventExposure_Notify message may include at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information.

In stage 2b, when receiving the Nsmf_EventExposure_Notify message, the NEF performs a configuration of information mapping, for example, mapping between an AF transaction internal ID and an AF transaction ID, mapping between SUPI and GPSI, or the like, and transmits, to an appropriate AF, the Nnef_TrafficInfluence_Notify message including the information received from the SMF.

Stage 2c shows a configuration of transmitting, by the SMF, an early notification to the AF when the AF requests an AF notification, not via the NEF. When, in stage 1, the SMF detects a user plane management event, in stage 2c SMF may transmit an early notification to the AF of the target DNAI of the PDU session by using the Nsmf_EventExposure_Notify service operation. The Nsmf_EventExposure_Notify message may include at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information.

In stage 2d, the AF having received the early notification may check the ID of the target DNAI and determine whether the target DNAI is within the coverage of the local DN for which the AF is responsible. When the target DNAI is out of the coverage of the local DN for which the AF is responsible, the AF may identify a new AF that is responsible for a new local DN, that is, the target AF, and perform an AF migration configuration as the target AF. Through the above configuration, the AF may perform application relocation to the target AF and transmit, to the target AF, AF notification subscription information, user information, and UE information (application information, account information, or the like).

Stages 2e and 2f show a configuration of transmitting, by the AF, a response to the early notification to the SMF via NEF when the AF requests an AF notification via the NEF. In stage 2e, the AF may transmit a response to the Nnef_TrafficInfluence_Notify message, to the NEF, by using the Nnef_TrafficInfluence_AppRelocationInfo service operation. When, in stage 2d, the target DNAI is within the coverage of the local DN for which the AF is responsible, the AF may transmit the Nnef_TrafficInfluence_AppRelocationInfo message, to the NEF, immediately or after performing application relocation needed as the target DNAI. The Nnef_TrafficInfluence_AppRelocationInfo message may include N6 traffic routing information toward the target DNAI. Furthermore, the AF may transmit a positive or negative response. When the AF is unable to perform application relocation in time, the AF may include a negative cause code in the Nnef_TrafficInfluence_AppRelocationInfo message. When, in stage 2d, the target DNAI is out of the coverage of the local DN for which the AF is responsible, the AF may notify the SMF of an indication indicating that an AF change is necessary, the ID of the target AF responsible for the target local DN to which the target DNAI belongs, and an address of the target AF to which a message is transmitted. To this end, the AF may transmit, to the NEF, the Nnef_TrafficInfluence_AppRelocationInfo message including at least one piece of information of an indication of an AF change, a target AF ID, or a notification target address of the target AF, a target AF ID, or a notification target address of a target AF.

In stage 2f, when receiving the Nnef_TrafficInfluence_AppRelocationInfo message, the NEF may transmit, to an appropriate SMF, the Nsmf_EventExposure_AppRelocationInfo message including the information received from the AF.

Stage 2g shows a configuration of transmitting, by the AF, a response to the early notification to the SMF when the AF requests an AF notification, not via the NEF. The AF may transmit a response to the Nsmf_EventExposure_Notify message, to the SMF, by using the Nsmf_EventExposure_AppRelocationInfo service operation. When, in stage 2d, the target DNAI is within the coverage of the local DN for which the AF is responsible, the AF may transmit the Nsmf_EventExposure_AppRelocationInfo message, to the SMF, immediately or after performing application relocation needed as the target DNAI. The Nsmf_EventExposure_AppRelocationInfo message may include the N6 traffic routing information toward the target DNAI. Furthermore, the AF may transmit a positive or negative response. When the AF is unable to perform application relocation in time, the AF may include a negative cause code in the Nsmf_EventExposure_AppRelocationInfo message. When, in stage 2d, the target DNAI is out of the coverage of the local DN for which the AF is responsible, the AF may notify the SMF of an indication indicating that an AF change is necessary, the ID of the target AF responsible for the target local DN to which the target DNAI belongs, and an address of the target AF to which a message is transmitted. To this end, the AF may transmit, to the SMF, the Nsmf_EventExposure_AppRelocationInfo message including at least one piece of information of an indication of an AF change, a target AF ID, or a notification target address of the target AF, a target AF ID, or a notification target address of the target AF.

Stages 2h and 2i show a configuration of transmitting, by the SMF, an early notification to the target AF via the NEF when the AF requests an AF notification via the NEF. In the previous transceiving process of an early notification, when the SMF receives, through a message response to the early notification, an indication that an AF change is necessary, in stage 2h, the SMF may transmit an early notification to the NEF of the target DNAI of the PDU session by using an Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also the information about the target AF (an indication of an AF change, a target AF ID, or a notification target address of the target AF) included in the received early notification response message.

In stage 2i, when receiving the Nsmf_EventExposure_Notify message, the NEF may perform a configuration of information mapping, for example, mapping between an AF transaction internal ID and an AF transaction ID, mapping between SUPI and GPSI, or the like, and a configuration of setting the information about the target AF within the NEF, and may transmit, to the target AF, the Nnef_TrafficInfluence_Notify message including the information received from the SMF.

Stage 2j shows a configuration of transmitting, by the SMF, an early notification to the AF when the AF requests an AF notification, not via the NEF. In the previous transceiving process of an early notification, when the SMF receives, through a message response to the early notification, an indication that an AF change is necessary, in stage 2j, the SMF may transmit an early notification to the target AF of the target DNAI of the PDU session based on the information about the target AF (an indication of an AF change, a target AF ID, or a notification target address of the target AF) that received from the early notification response message by using the Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also the information about the target AF (an indication of an AF change, a target AF ID, or a notification target address of the target AF) included in the received early notification response message.

Stage 2k and 2l show a configuration of transmitting, by the target AF, a response to the early notification to the SMF via NEF when the AF requests an AF notification via the NEF. In stage 2k, the target AF may transmit a response to the Nnef_TrafficInfluence_Notify message to the NEF by using the Nnef_TrafficInfluence_AppRelocationInfo service operation. The target AF may transmit the Nnef_TrafficInfluence_AppRelocationInfo message, to the NEF, immediately or after performing application relocation needed as the target DNAI. The Nnef_TrafficInfluence_AppRelocationInfo message may include N6 traffic routing information toward the target DNAI. Furthermore, the target AF may transmit a positive or negative response. When the target AF is unable to perform application relocation in time, the target AF may include a negative cause code in the Nnef_TrafficInfluence_AppRelocationInfo message.

In stage 2l, when receiving the Nnef_TrafficInfluence_AppRelocationInfo message, the NEF may transmit, to an appropriate SMF, the Nsmf_EventExposure_AppRelocationInfo message including the information received from the target AF.

Stage 2m shows a configuration of transmitting, by the target AF, a response to the early notification to the SMF when the AF requests an AF notification, not via the NEF, or when the target AF receives an AF notification, not via the NEF. The target AF may transmit a response to the Nsmf_EventExposure_Notify message, to the SMF, by using the Nsmf_EventExposure_AppRelocationInfo service operation. The target AF may transmit the Nsmf_EventExposure_AppRelocationInfo message, to the SMF, immediately or after performing application relocation needed as the target DNAI. The Nsmf_EventExposure_AppRelocationInfo message may include the N6 traffic routing information toward the target DNAI. Furthermore, the target AF may transmit a positive or negative response. When the target AF is unable to perform application relocation in time, the AF may include a negative cause code in the Nsmf_EventExposure_AppRelocationInfo message.

The configurations of stages 3 to 4b relate to the change of the existing user plane management event subscription information of the source AF, to subscription information of a changed target AF, when an AF change occurs as the local DN is changed according to a DNAI change. A subscription information changing method may include two methods: a method of updating, by the target AF, the existing subscription information, as in stage 3, and a method of erasing, by the source AF, the existing subscription information and performing, by the target AF, a new subscription, as in stages 4a and 4b. Of stages 3 to 4b, only stage 3 may be performed or only stages 4a and 4b may be performed. Furthermore, the configurations of stages 3 to 4b may be omitted depending on the situation.

In stage 5, when a user plane management event is detected in stage 1, the SMF may perform the removal, change, and addition of the UPF, or the change of the DNAI. When runtime coordination is set between the 5GC and the AF and the AF requests an early notification, according to the "AF acknowledgment to be expected" indication included in the AF request message, the SMF may wait for a response to the early notification from the AF before performing stage 5, and may not perform stage 5 until a positive response is received from the AF.

Stage 6 may be performed when, in stage 1, the SMF detects a user plane management event and the AF requests a late notification. In FIG. 4, only a case when the AF requests an early notification is described. The configuration regarding the late notification may be described with reference to FIG. 2 or 3.

Figure 5:
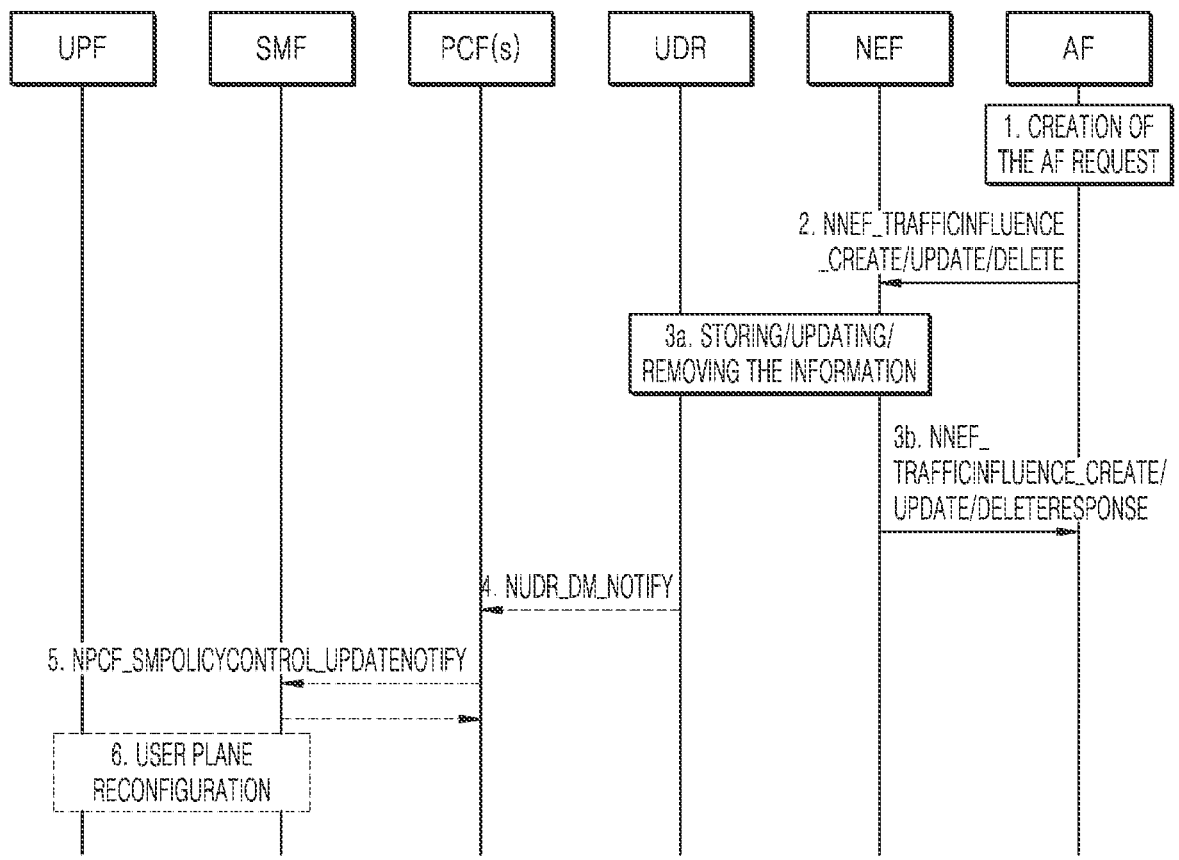
FIG. 5 is a diagram of a configuration of joining or subscribing to a service to request an AF notification when a traffic routing change or a user plane management event regarding a protocol data unit (PDU) session occurs, by transmitting, by an AF, AF requests to a policy control function (PCF) according to an embodiment of the disclosure.

FIG. 5 is a diagram of a configuration of joining or subscribing to a service to request an AF notification when a traffic routing change or a user plane management event regarding a protocol data unit (PDU) session occurs, by transmitting, by an AF, AF requests to a policy control function (PCF) according to an embodiment of the disclosure.

Referring to FIG. 5, in stage 1, the AF may generate an AF request. The AF request may include at least one piece of information of an AF transaction ID, an address (IP or Ethernet) of a UE if available, GPSI if available, DNN if available, S-NSSAI if available, External Group Identifier if available, application identifier or traffic filtering information, AF-service-identifier, a list of DNAI(s) and corresponding routing profile ID(s) or N6 traffic routing information, an indication of traffic correlation, an indication of application relocation possibility, an indication of UE IP address preservation, or early and/or late notifications about UP path management events or temporal validity condition and spatial validity condition. Furthermore, the SMF may check the ID of the target DNAI and determine whether the target DNAI is within the coverage of the local DN for which the AF, which has subscribed a notification service, is responsible, and when the target DNAI is out of the coverage of the local DN for which the AF, which has subscribed a notification service, is responsible, the AF may add neighboring AF information to an AF request to identify an AF which is responsible for a new local DN, that is, the target AF. The neighboring AF information may include at least one piece of information of AF ID of neighboring AFs of an AF that transmits an AF request, a DNAI list in the coverage of the local DN for which each of the neighboring AFs is responsible, or a notification target address at which a notification may be transmitted to each of the neighboring AFs. For example, as shown below, the AF may add information about neighboring AFs (AF #1, AF #2, and AF #3) to an AF request.

Neighboring AF information
(AF #1 ID, DNAI #1, notification target address)
(AF #2 ID, DNAI #2, notification target address)
(AF #3 ID, DNAI #3, notification target address)

A method of sharing the above-described information, such as the AF ID, the DNAI list, and the notification target address by neighboring AFs may correspond to the outside of a 3GPP standard scope and may be implemented through signaling or pre-configuration between the AFs. Furthermore, the AF that transmits an AF request may transmit, to the neighboring AFs (AF #1, AF #2, and AF #3), information, such as an AF ID of the AF, an AF transaction identifier, or a notification target address, and the neighboring AFs may store the received information. Furthermore, the above method may correspond to an operation between the AFs out of the 3GPP standard scope.

In stage 2, the AF may transmit an AF request to the NEF by using a Nnef_TrafficInfluence Create service operation. To update or erase an existing request, the AF may use a Nnef_TrafficInfluence Update or Nnef_TrafficInfluence Delete service operation with the AF transaction ID regarding an existing request to be updated or erased. When the AF is able to transmit an AF request directly to the PCF, not via the NEF, the AF may search for an appropriate PCF by using an Nbsf_management_Discovery service. The NEF may perform necessary authorization control, and perform mapping between the information transmitted by the AF and information needed inside the 5GC.

In stage 3a, when the AF performs a Nnef_TrafficInfluence Create or Update operation, the NEF may store AF request information in the UDR as follows.

(Data Set=Application Data; Data Subset=AF traffic influence request information, Data Key=AF transaction internal ID, S-NSSAI and DNN and/or Internal Group Identifier or SUPI).

When the AF performs a Nnef_TrafficInfluence delete operation, the NEF may erase AF requirements information in the UDR.

(Data Set=Application Data; Data Subset=AF traffic influence request information, Data Key=AF transaction internal ID).

In stage 3b, the NEF may notify a create/update/delete result of an AF request by transmitting a response message to the AF.

In stage 4, the UDR may transmit a notification regarding a change of the stored data by transmitting a Nudr_DM_Notify message to the PCFs which subscribe to a notification service regarding the AF request change.

(Data Set=Application Data; Data Subset=AF traffic influence request information, Data Key=S-NSSAI and DNN and/or Internal Group Identifier or SUPI)

In stage 5, the PCF involved in the AF request may update a PCC rule of a PDU session related to the AF request by using an Npcf_SMPolicyControl_UpdateNotify service operation. When the AF request includes a notification request regarding the UP path change, an Npcf_SMPolicyControl_UpdateNotify message may include a notification correlation ID including the AF transaction internal ID, and a notification target address towards the NEF or the AF.

In stage 6, when receiving the PCC rule, the SMF may perform reconfiguration of a user plane of a PDU session through the following action.

Figure 6:
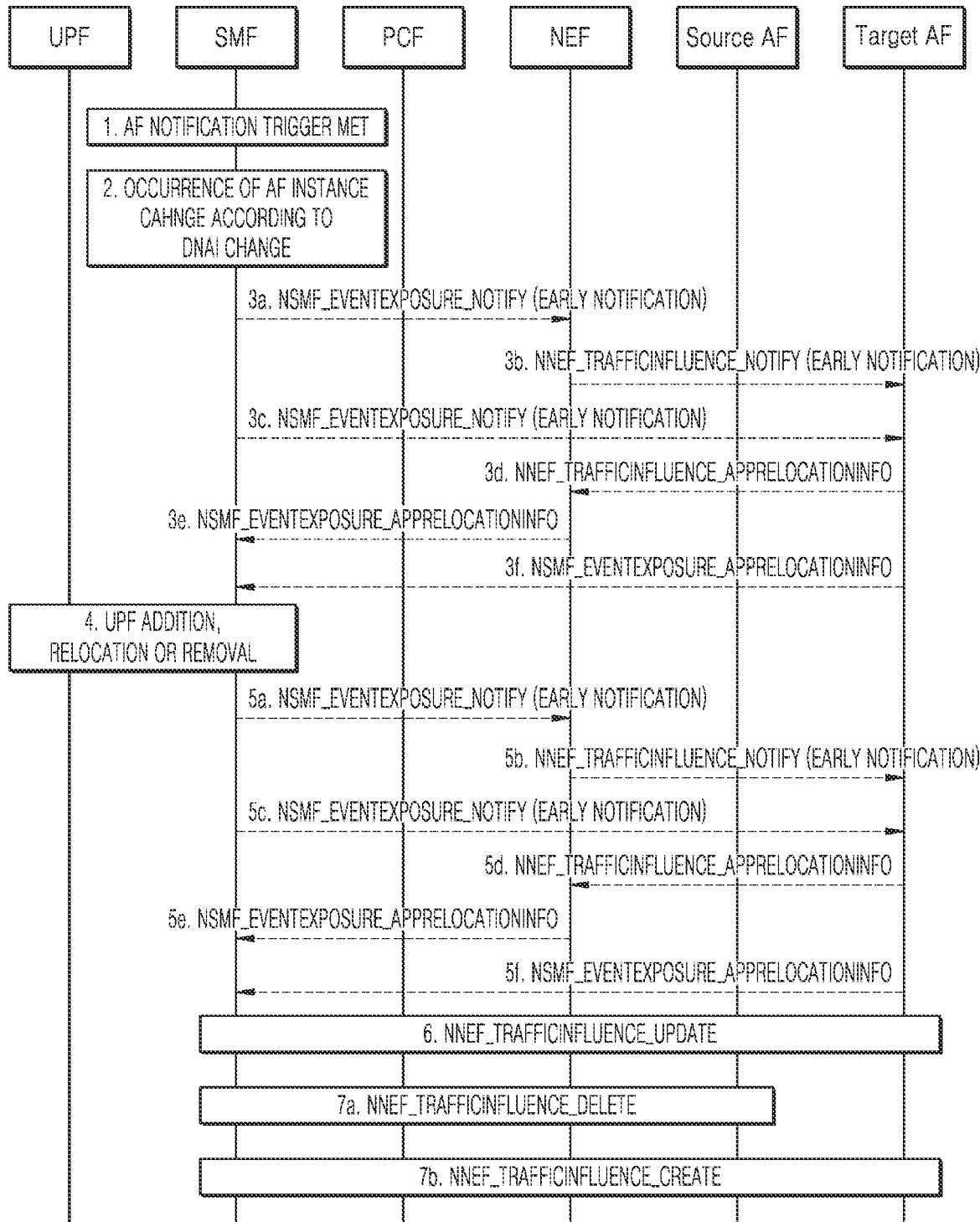
FIG. 6 is a diagram of a configuration of transmitting, by an SMF, an early/late notification to a target AF when user plane management events occur according to an embodiment of the disclosure.

Adding/replacing/removing of UPF in data path (e.g., UL CL or Branching Point)
  New Prefix UE configuration (when applying multi-homing)
  UPF update to target DNAI
  Notification subscription to AMF FIG. 6 is a diagram of a configuration of transmitting, by the SMF, an early/late notification to the target AF when user plane management events occur according to an embodiment of the disclosure.

More particularly, in FIG. 6, provided is a method of transmitting, by the SMF, a notification to the target AF with respect to a change of the AF responsible for the local DN according to a DNAI change by using an early notification or a late notification when the AF adds neighboring AF information to the AF request.

Referring to FIG. 6, in stage 1, the SMF may detect generation of a user plane management event when an AF notification is generated (that is, a condition to trigger the AF notification is satisfied). Examples of a user plane management event are as follows.

Generation and removal of a PDU session anchor (PSA)
  DNAI change
  Ethernet PSA Relocation
  Other events that an AF requests through a notification subscription request In stage 2, the SMF may check the ID of a changed target DNAI, and determine whether the changed target DNAI is within the coverage of the local DN for which a current AF is responsible, based on the neighboring AF information received from the AF. When the target DNAI is out of the coverage of the local DN for which a current AF is responsible, the SMF may identify the AF responsible for a new local DN, that is, the target AF, and transmit an early/late notification to the target AF. The target AF having received a notification from the SMF may perform application relocation with the source AF, and receive, from the source AF, AF notification subscription information, user information, and UE information (application information, account information, or the like).

Stages 3a and 3b show a configuration of transmitting, by the SMF, an early notification to the target AF via the NEF when the AF requests an AF early notification via the NEF. In stage 2, when the SMF determines that a change of the AF is necessary, in stage 3a, the SMF may transmit an early notification to the NEF of the target DNAI of the PDU session by using an Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also an indication indicating that an AF change is necessary and the information about the target AF (an indication of an AF change, a target AF ID, or a notification target address of the target AF) included in the neighboring AF information.

In stage 3b, when receiving the Nsmf_EventExposure_Notify message, the NEF may perform a configuration of information mapping, for example, mapping between an AF transaction internal ID and an AF transaction ID, mapping between SUPI and GPSI, or the like, and a configuration of setting the information about the target AF within the NEF, and may transmit, to the target AF, the Nnef_TrafficInfluence_Notify message including the information received from the SMF. The target AF having received an early notification may identify, by checking an indication of an AF change, an AF transaction ID, and a source AF ID, that the target AF becomes a new responsible AF as the AF is changed according to the DNAI change. Furthermore, the target AF may check the ID of the target DNAI and identify whether the target DNAI is within the coverage of the local DN for which the target AF is responsible. The target AF may identify the source AF and perform AF migration with the source AF. Through the above configuration, the target AF may perform application relocation and receive AF notification subscription information, user information, and UE information (application information, account information, or the like).

Stage 3c shows a configuration of transmitting, by the SMF, an early notification to the target AF when the AF requests an AF early notification, not via the NEF. In stage 2, when the SMF determines that a change of the AF is necessary, in stage 3c, the SMF may transmit an early notification to the target AF of the target DNAI of the PDU session based on the information about the target AF (an indication of an AF change, a target AF ID, or a notification target address of the target AF) by using the Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also an indication indicating an AF change and the information about the target AF (an indication of an AF change, a target AF ID, or a notification target address of the target AF). The target AF having received the early notification may identify, by checking an indication of an AF change, an AF transaction ID, and a source AF ID, that the target AF becomes a new responsible AF as the AF is changed according to the DNAI change.

Furthermore, the target AF may check the ID of the target DNAI and identify whether the target DNAI is within the coverage of the local DN for which the target AF is responsible. The target AF may identify the source AF and perform AF migration with the source AF. Through the above configuration, the target AF may perform application relocation and receive AF notification subscription information, user information, and UE information (application information, account information, or the like).

Stages 3d and 3e show a configuration of transmitting, by the target AF, a response to the early notification to the SMF via NEF when the AF requests an AF early notification via the NEF. In stage 3d, the target AF may transmit a response to the Nnef_TrafficInfluence_Notify message, to the NEF, by using the Nnef_TrafficInfluence_AppRelocationInfo service operation. The target AF may transmit the Nnef_TrafficInfluence_AppRelocationInfo message, to the NEF, immediately or after performing application relocation needed as the target DNAI. The Nnef_TrafficInfluence_AppRelocationInfo message may include N6 traffic routing information toward the target DNAI. Furthermore, the target AF may transmit a positive or negative response. When the target AF is unable to perform application relocation in time, the target AF may include a negative cause code in the Nnef_TrafficInfluence_AppRelocationInfo message.

In stage 3e, when receiving the Nnef_TrafficInfluence_AppRelocationInfo message, the NEF may transmit, to an appropriate SMF, the Nsmf_EventExposure_AppRelocationInfo message including the information received from the target AF.

Stage 3f shows a configuration of transmitting, by the target AF, a response to the early notification to the SMF when the AF requests an AF early notification, not via the NEF (or when the target AF receives an AF notification, not via the NEF). The target AF may transmit a response to the Nsmf_EventExposure_Notify message, to the SMF, by using the Nsmf_EventExposure_AppRelocationInfo service operation. The target AF may transmit the Nsmf_EventExposure_AppRelocationInfo message, to the SMF, immediately or after performing application relocation needed as the target DNAI. The Nsmf_EventExposure_AppRelocationInfo message may include the N6 traffic routing information toward the target DNAI. Furthermore, the target AF may transmit a positive or negative response. When the target AF is unable to perform application relocation in time, the AF may include a negative cause code in the Nsmf_EventExposure_AppRelocationInfo message.

In stage 4, the SMF may perform removal, change, and addition of the UPF, or a change of the DNAI. When runtime coordination is set between the 5GC and the AF, according to the "AF acknowledgment to be expected" indication included in the AF request message, the SMF may wait for a response to the early notification from the AF before performing stage 4 and may not perform stage 4 until a positive response is received from the AF.

Stages 5a and 5b show a configuration of transmitting, by the SMF, a late notification to the target AF via the NEF when the AF requests an AF late notification via the NEF. In stage 2, when the SMF determines that a change of the AF is necessary, in stage 5a, the SMF may transmit a late notification to the NEF of the target DNAI of the PDU session by using the Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also an indication indicating that an AF change is necessary and the information about the target AF (an indication of an AF change, a target AF ID, or a notification target address of the target AF) included in the neighboring AF information. When runtime coordination is set between the 5GC and the AF, according to the "AF acknowledgment to be expected" indication included in the AF request message, the SMF may wait for a response to the late notification from the AF, and may not transmit data through a new UP path until a positive response is received from the AF.

In stage 5b, when receiving the Nsmf_EventExposure_Notify message, the NEF performs a configuration of information mapping, for example, mapping between an AF transaction internal ID and an AF transaction ID, mapping between SUPI and GPSI, or the like, and a configuration of setting information about the target AF in the NEF, and may transmit, to the target AF, the Nnef_TrafficInfluence_Notify message including the information received from the SMF. The target AF having received the late notification may identify, by checking an indication of an AF change, an AF transaction ID, and a source AF ID, that the target AF becomes a new responsible AF as the AF is changed according to the DNAI change. Furthermore, the target AF may check the ID of the target DNAI and identify whether the target DNAI is within the coverage of the local DN for which the target AF is responsible. The target AF may identify the source AF and perform AF migration with the source AF Through the above configuration, the target AF may perform application relocation and receive AF notification subscription information, user information, and UE information (application information, account information, or the like).

Stage 5c shows a configuration of transmitting, by the SMF, a late notification to the target AF when the AF requests an AF late notification, not via the NEF. In stage 2, when the SMF determines that an AF change is necessary, in stage 5c, the SMF may transmit a late notification to the target AF of the target DNAI of the PDU session based on the information about the target AF (an indication of an AF change, a target AF ID, or a notification target address of the target AF) by using the Nsmf_EventExposure_Notify service operation. The Nsmf_EventExposure_Notify message may include not only at least one piece of information of an AF transaction internal ID, a type of a notification, i.e., an early notification or a late notification, identify of a source DNAI and/or identify of a target DNAI, an IP address/prefix or MAC address of a UE, or GPSI or N6 traffic routing information, but also an indication indicating an AF change and information about the target AF (an indication of an AF change, a target AF ID, or a notification target address of the target AF). The target AF having received the late notification may identify, by checking an indication of an AF change, an AF transaction ID, and a source AF ID, that the target AF becomes a new responsible AF as the AF is changed according to the DNAI change. Furthermore, the target AF may check the ID of the target DNAI and identify whether the target DNAI is within the coverage of the local DN for which the target AF is responsible. The target AF may identify the source AF and perform AF migration with the source AF. Through the above configuration, the target AF may perform application relocation and receive AF notification subscription information, user information, and UE information (application information, account information, or the like).

Stages 5d and 5e show a configuration of transmitting, by the target AF, a response to the late notification to the SMF via the NEF when the AF requests an AF late notification via the NEF. In stage 5d, the target AF may transmit a response to the Nnef_TrafficInfluence_Notify message, to the NEF, by using the Nnef_TrafficInfluence_AppRelocationInfo service operation. The target AF may transmit the Nnef_TrafficInfluence_AppRelocationInfo message, to the NEF, immediately or after performing application relocation needed as the target DNAI. The Nnef_TrafficInfluence_AppRelocationInfo message may include N6 traffic routing information toward the target DNAI. Furthermore, the target AF may transmit a positive or negative response. When the target AF is unable to perform application relocation in time, the target AF may include a negative cause code in the Nnef_TrafficInfluence_AppRelocationInfo message.

In stage 5e, when receiving the Nnef_TrafficInfluence_AppRelocationInfo message, the NEF may transmit, to an appropriate SMF, the Nsmf_EventExposure_AppRelocationInfo message including the information received from the target AF.

Stage 5f shows a configuration of transmitting, by the target AF, a response to the late notification to the SMF when the AF requests an AF late notification, not via the NEF (or when the target AF receives an AF notification, not via the NEF). The target AF may transmit a response to the Nsmf_EventExposure_Notify message, to the SMF, by using the Nsmf_EventExposure_AppRelocationInfo service operation. The target AF may transmit the Nsmf_EventExposure_AppRelocationInfo message, to the SMF, immediately or after performing application relocation needed as the target DNAI. The Nsmf_EventExposure_AppRelocationInfo message may include the N6 traffic routing information toward the target DNAI. Furthermore, the target AF may transmit a positive or negative response. When the target AF is unable to perform application relocation in time, the AF may include a negative cause code in the Nsmf_EventExposure_AppRelocationInfo message.

The configurations of stages 6 to 7b relate to the change of the existing user plane management event subscription information that the source AF has subscribed, to subscription information of a changed target AF, when an AF change occurs as the local DN is changed according to a DNAI change. A subscription information changing method may include two methods: a method of updating, by the target AF, the existing subscription information, as in stage 6, a method of erasing, by the source AF, the existing subscription information and performing, by the target AF, a new subscription, as in stages 7a and 7b. Of stages 6 to 7b, only stage 6 may be performed or only stages 7a and 7b may be performed. Furthermore, the configurations of stages 6 to 7b may be omitted depending on the situation.

Figure 7:
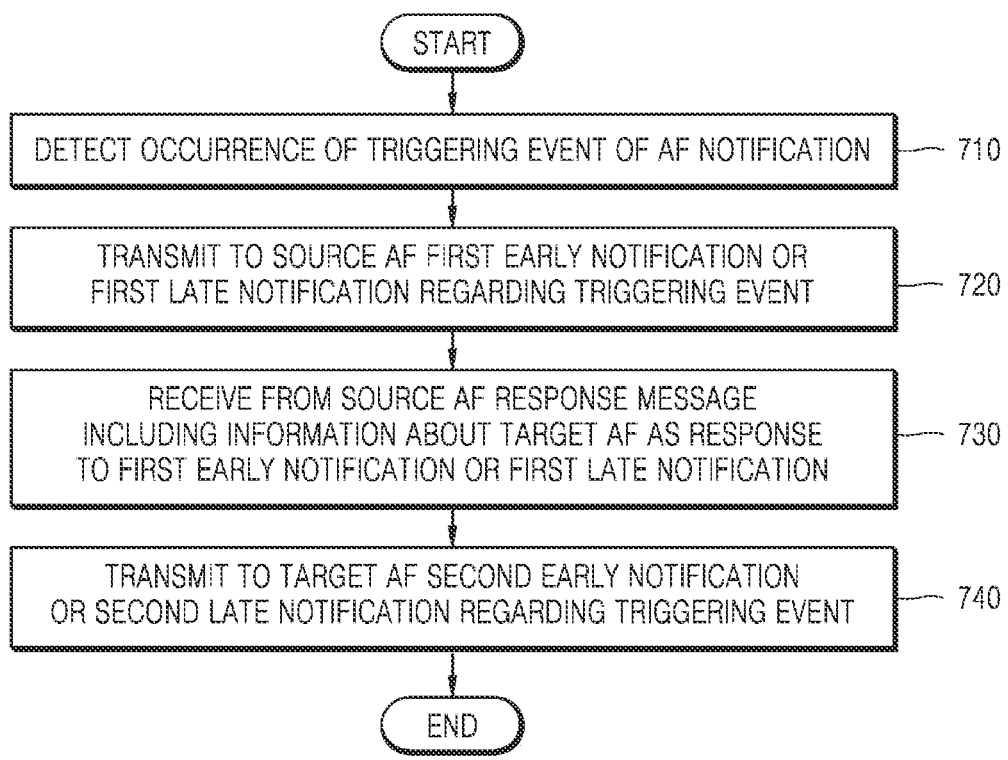
FIG. 7 is a flowchart of a method of transmitting, by an SMF, a notification to a target AF according to an embodiment of the disclosure.

FIG. 7 is a flowchart of a method of transmitting, by an SMF, a notification to a target AF according to an embodiment of the disclosure.

Referring to FIG. 7, at operation 710, the SMF may detect occurrence of a triggering event of an AF notification.

At operation 720, the SMF may transmit to the source AF a first early notification or a first late notification regarding the triggering event. Whether the SMF transmit any one of the first early notification and the first late notification or both of the two notifications may be determined according to whether the AF requests an early notification or a late notification or both of the two notifications. Furthermore, a transceiving configuration of an early notification and a response and a transceiving configuration of a late notification and a response may be not simultaneously, but separately performed, and a description thereof may be presented with reference to FIGS. 2 to 6.

At operation 730, the SMF may receive a response message including information about the target AF, from the source AF, as a response to the first early notification or the first late notification. The source AF may determine whether the target DNAI included in the notification received from the SMF at operation 720 is within the coverage of the local DN for which the source AF is responsible. When the target DNAI is not within the coverage of the local DN for which the source AF is responsible, the source AF may transmit, to the SMF, a response message including an indication indicating that an AF change is necessary, the ID of the target AF responsible for the target local DN to which the target DNAI belongs, and an address of the target AF to which the SMF transmits a message.

At operation 740, the SMF may transmit, to the target AF, a second early notification or a second late notification regarding the triggering event based on the information about the target AF. The SMF may identify the target AF and an address of the target AF by using the response message received at operation 730, and transmit a notification to the target AF.

Figure 8:
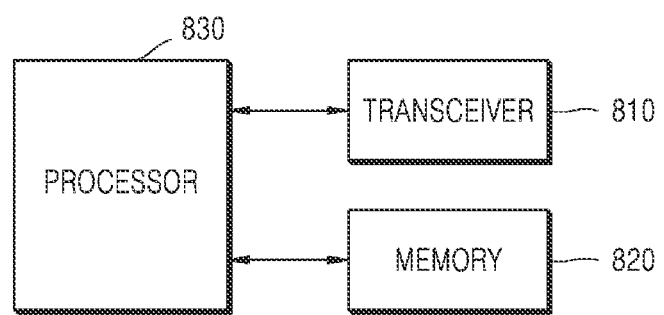
FIG. 8 is a block diagram of a structure of a network function (NF) according to an embodiment of the disclosure.

FIG. 8 is a block diagram of a structure of a network function (NF) according to an embodiment of the disclosure.

Each of network entities or NFs described with reference to FIGS. 1 to 7 may correspond to the NF of FIG. 8. For example, the structures of the SMF, the NEF, the AF, or the like, may correspond to the structure of the NF described in FIG. 8.

Referring to FIG. 8, the NF may include a transceiver 810, a memory 820, and a processor 830. The transceiver 810, the processor 830, and the memory 820 of the NF may operate according to the above-described communication method of the NF. However, the constituent elements of the NF are not limited to the above-described example. For example, the NF may include more or less constituent elements than the above-described constituent elements. In addition, the transceiver 810, the processor 830, and the memory 820 may be implemented in the form of a single chip. Furthermore, the processor 830 may include one or more processors.

The transceiver 810, which collectively refers to a receiver of the NF and a transmitter of the NF, may transceive signals with a base station, a UE, or another NF. Signals to be transceived with a base station, a UE, or another NF may include control information and data. To this end, the transceiver 810 may include an RF transmitter for up-converting and amplifying the frequency of a signal to be transmitted and an RF receiver for low noise amplifying a received signal and down-converting the frequency of the signal. However, this is merely an embodiment of the transceiver 810, and the constituent elements of the transceiver 810 are not limited to the RF transmitter and the RF receiver.

Furthermore, the transceiver 810 may receive a signal through a wireless channel, output the received signal to the processor 830, and transmit a signal output from the processor 830 through a wireless channel.

The memory 820 may store programs and data needed for an operation of the NF. Furthermore, the memory 820 may store control information or data included in a signal obtained from the NF. The memory 820 may include storage media, such as a read only memory (ROM), a random access memory (RAM), hard disks, a compact disc ROM (CD-ROM), and a digital versatile disc (DVD), or a combination of the storage media. Furthermore, the memory 820 may not be separately provided, but may be provided by being included in the processor 830.

The processor 830 may control a series of processes such that the NF is operated according to the above-described embodiment of the disclosure. For example, the processor 830 may receive a control signal and a data signal through the transceiver 810 and process the received control signal and data signal. Furthermore, the processor 830 may transmit the processed control signal and data signal through the transceiver 810. The processor 830 may include a plurality of processors, and the processor 830 may perform an NF's constituent element control operation by executing a program stored in the memory 820.

According to an embodiment of the disclosure, the processor 830 may detect occurrence of a triggering event of an AF notification, transmit, to the source AF, a first early notification or a first late notification regarding the triggering event, receive a response message including information about the target AF, from the source AF, as a response to the first early notification or the first late notification, and transmit, to the target AF, a second early notification or a second late notification regarding the triggering event based on the information about the target AF.

According to an embodiment of the disclosure, the processor 830 may receive, from the source AF, information about neighboring AFs of the source AF, detect occurrence of an AF notification triggering event, determine whether an AF corresponding to the target DNAI is changed to the target AF according to the triggering event based on the information about neighboring AFs of the source AF, and transmit, to the target AF, a first early notification or a first late notification regarding the triggering event.

Figure 9:
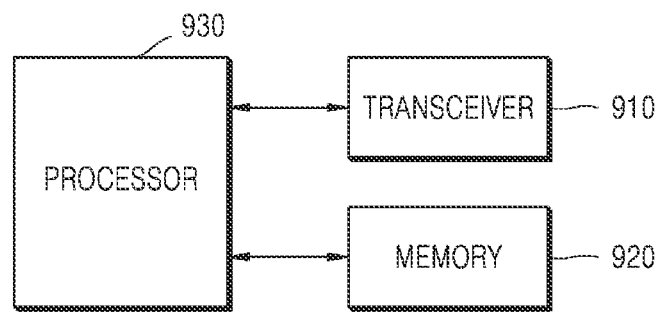
FIG. 9 is a block diagram of a structure of a user equipment (UE) according to an embodiment of the disclosure.

FIG. 9 is a block diagram of a structure of a UE according to an embodiment of the disclosure.

The UE described with reference to FIGS. 1 to 8 may correspond to the UE of FIG. 9.

Referring to FIG. 9, the UE may include a transceiver 910, a memory 920, and a processor 930. The transceiver 910, the processor 930, and the memory 920 of the UE may operate according to the above-described communication method of the UE. However, the constituent elements of the UE are not limited to the above-described example. For example, the UE may include more or less constituent elements than the above-described constituent elements. In addition, the transceiver 910, the processor 930, and the memory 920 may be implemented in the form of a single chip. Furthermore, the processor 930 may include one or more processors.

The transceiver 910, which collectively refers to a receiver of the UE and a transmitter of the UE, may transceive signals with a base station, an NF, or another UE. Signals to be transceived with a base station, an NF, or another UE may include control information and data. To this end, the transceiver 910 may include an RF transmitter for up-converting and amplifying the frequency of a signal to be transmitted and an RF receiver for low noise amplifying a received signal and down-converting the frequency of the signal. However, this is merely an embodiment of the transceiver 910, and the constituent elements of the transceiver 910 are not limited to the RF transmitter and the RF receiver.

Furthermore, the transceiver 910 may receive a signal through a wireless channel, output the received signal to the processor 930, and transmit a signal output from the processor 930 through a wireless channel.

The memory 920 may store programs and data needed for an operation of the UE. Furthermore, the memory 920 may store control information or data included in a signal obtained from the UE. The memory 920 may include storage media, such as a ROM, a RAM, hard disks, a CD-ROM, and a DVD, or a combination of the storage media. Furthermore, the memory 920 may not be separately provided, but may be provided by being included in the processor 930.

The processor 930 may control a series of processes such that the UE is operated according to the above-described embodiment of the disclosure. For example, the processor 930 may receive a control signal and a data signal through the transceiver 910 and process the received control signal and data signal. Furthermore, the processor 930 may transmit the processed control signal and data signal through the transceiver 910. The processor 930 may include a plurality of processors, and the processor 930 may perform a UE's constituent element control operation by executing a program stored in the memory 920.

The methods according to the embodiments described in the claims and specification of the disclosure may be implemented by hardware, software, or a combination of hardware and software.

When the method is implemented by software, a computer-readable storage medium for storing one or more programs (software modules) may be provided. One or more programs stored in a computer-readable storage medium are configured for execution by one or more processors in an electronic device. One or more programs may include instructions to cause an electronic device to execute the methods according to the embodiments described in the claims or specification of the disclosure.

Such a program (software module or software) may be stored in non-volatile memories including a RANI and a flash memory, a ROM, an electrically erasable programmable ROM (EEPROM), magnetic disc storage devices, a CD-ROM, DVDs or other types of optical storage devices, or magnetic cassettes. Alternatively, the program may be stored in a memory including some or all of the above memories. Furthermore, each constituent memory may include a plurality of memories.

Furthermore, the program may be stored in attachable storage devices which are accessible through a communication network including Internet, Intranet, a local area network (LAN), Wide LAN (WLAN), or a storage area network (SAN), or a combination thereof. Such a storage device may access, through an external port, an apparatus that performs an embodiment of the disclosure. Furthermore, a separate storage device on a communication network may access an apparatus that performs an embodiment of the disclosure.

The disclosed embodiment provides an apparatus and a method of effectively providing a service in a wireless communication system.

The embodiments of the disclosure disclosed in the specification and drawings are to provide specific examples to easily describe the technical contents of the disclosure and help understanding of the disclosure, not to limit the scope of the disclosure. In other words, it is obvious to a person skilled in the art to which the disclosure pertains that other modified examples based on the technical concept of the disclosure are possible. Furthermore, the respective embodiments may be used by being combined with each other, as necessary. For example, a base station and an UE may be operated as parts of an embodiment and another embodiment of the disclosure are combined with each other. Furthermore, the embodiments of the disclosure may be applicable to other communication systems, and other modified examples based on the technical concept of the disclosure may also be possible.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an application function (AF) entity in a wireless communication system, the method comprising:
    receiving, from a session management function (SMF) entity, a late notification message including a target data network access identifier (DNAI);
    identifying whether the target DNAI is available to be served by the AF entity;
    in case that the target DNAI is not available to be served by the AF entity, identifying a target AF entity for the target DNAI and performing a AF migration to the target AF entity; and
    transmitting, to the SMF entity, a response message including N6 traffic routing information related to the target DNAI as a response to the late notification message.

2. The method of claim 1, wherein the response message includes at least one of an indication of an AF change, a target AF identifier (ID), or a notification target address of the target AF.

3. The method of claim 1,
    wherein the response message includes a cause code, and
    wherein the cause code corresponding to a negative response in case that an application relocation in the target DNAI is not completed successfully on time.

4. The method of claim 1, further comprising:
    identifying whether a change of the AF entity is needed based on a result of identifying whether the target DNAI is available to be served by the AF entity.

5. The method of claim 1, wherein the late notification message includes the target DNAI of a protocol data unit (PDU) session.

6. The method of claim 1, wherein the late notification message is received from the SMF entity in case that a late direct notification is requested by the AF entity.

7. The method of claim 1, wherein the response message is transmitted immediately, or after a required application relocation in the target DNAI is completed.

8. A method performed by a session management function (SMF) entity in a wireless communication system, the method comprising:
    transmitting, to an application function (AF) entity, a late notification message including a target data network access identifier (DNAI); and
    receiving, from the AF entity, a response message including N6 traffic routing information related to the target DNAI as a response to the late notification message,
    wherein whether the target DNAI is available to be served by the AF entity is identified,
    wherein in case that the target DNAI is not available to be served by the AF entity, a target AF entity for the target DNAI is identified and a AF migration to the target AF entity is performed by the AF entity.

9. The method of claim 8, wherein the response message includes at least one of an indication of an AF change, a target AF identifier (ID), or a notification target address of the target AF.

10. The method of claim 8, wherein the response message includes a cause code, and
    wherein the cause code corresponding to a negative response in case that an application relocation in the target DNAI is not completed successfully on time.

11. The method of claim 8, wherein the late notification message includes the target DNAI of a protocol data unit (PDU) session.

12. The method of claim 8, wherein the late notification message is transmitted to the AF entity in case that a late direct notification is requested by the AF entity.

13. The method of claim 8, wherein the response message is received immediately, or after a required application relocation in the target DNAI is completed.

14. An application function (AF) entity performed in a wireless communication system, the AF entity comprising:
    a transceiver; and
    at least one processor coupled with the transceiver and configured to:
        receive, from a session management function (SMF) entity, a late notification message including a target data network access identifier (DNAI),
        identify whether the target DNAI is available to be served by the AF entity,
        in case that the target DNAI is not available to be served by the AF entity, identify a target AF entity for the target DNAI and perform a AF migration to the target AF entity, and
        transmit, to the SMF entity, a response message including N6 traffic routing information related to the target DNAI as a response to the late notification message.

15. The AF entity of claim 14, wherein the response message includes at least one of an indication of an AF change, a target AF identifier (ID), or a notification target address of the target AF.

16. The AF entity of claim 14,
    wherein the response message includes a cause code, and
    wherein the cause code corresponding to a negative response in case that an application relocation in the target DNAI is not completed successfully on time.

17. The AF entity of claim 14, wherein the at least one processor is further configured to:
    identify whether a change of the AF entity is needed based on a result of identifying whether the target DNAI is available to be served by the AF entity.

18. The AF entity of claim 14,
    wherein the late notification message includes the target DNAI of a protocol data unit (PDU) session.

19. The AF entity of claim 14, wherein the late notification message is received from the SMF entity in case that a late direct notification is requested by the AF entity.

20. The AF entity of claim 14, wherein the response message is transmitted immediately, or after a required application relocation in the target DNAI is completed.

* * * * *